United States Patent
Liu et al.

(10) Patent No.: US 11,218,979 B2
(45) Date of Patent: Jan. 4, 2022

(54) POWER CONTROL METHOD AND APPARATUS

(71) Applicant: XI'AN ZHONGXING NEW SOFTWARE CO., LTD., Shaanxi (CN)

(72) Inventors: Kun Liu, Shenzhen (CN); Bo Dai, Shenzhen (CN); Xianming Chen, Shenzhen (CN); Weiwei Yang, Shenzhen (CN); Huiying Fang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/638,358

(22) PCT Filed: Aug. 10, 2018

(86) PCT No.: PCT/CN2018/099927
§ 371 (c)(1),
(2) Date: Feb. 11, 2020

(87) PCT Pub. No.: WO2019/029695
PCT Pub. Date: Feb. 14, 2019

(65) Prior Publication Data
US 2020/0169970 A1    May 28, 2020

(30) Foreign Application Priority Data
Aug. 11, 2017    (CN) .......................... 201710687812.1

(51) Int. Cl.
*H04W 52/50*     (2009.01)
*H04W 52/24*     (2009.01)
(Continued)

(52) U.S. Cl.
CPC .......... *H04W 52/50* (2013.01); *H04W 52/242* (2013.01); *H04W 52/245* (2013.01); *H04W 52/367* (2013.01); *H04W 74/0833* (2013.01)

(58) Field of Classification Search
CPC ........... H04W 74/0833; H04W 52/367; H04W 52/242; H04W 52/50; H04W 52/245
See application file for complete search history.

(56) References Cited

U.S. PATENT DOCUMENTS

| 2012/0314640 | A1* | 12/2012 | Kim | ..................... H04W 52/367 |
| | | | | 370/311 |
| 2016/0212711 | A1* | 7/2016 | Yi | .......................... H04W 72/10 |
| 2016/0374026 | A1 | 12/2016 | Dinan | |

FOREIGN PATENT DOCUMENTS

| CN | 102893678 A | 1/2013 |
| CN | 104254135 A | 12/2014 |

(Continued)

OTHER PUBLICATIONS

International Search Report for corresponding application PCT/CN2018/099927 filed Aug. 10, 2018; dated Nov. 1, 2018.
(Continued)

*Primary Examiner* — Keith Ferguson
(74) *Attorney, Agent, or Firm* — Cantor Colburn LLP

(57) ABSTRACT

Disclosed is a power control method and apparatus. The power control method includes that a user equipment at level i sends a preamble on a resource of a Physical Random Access Channel (PRACH) at level k greater than or equal to i according to a determined power control mode, which includes at least one of: mode one: transmitted power of the preamble of the PRACH at level k is determined according to a path loss between the user equipment and a base station, maximum transmitted power, and target received power of the preamble of the PRACH at level k; mode two: the transmitted power of the preamble of the PRACH at level k (Continued)

A power control mode used by a user equipment at level i to send a preamble on a resource of a Physical Random Access Channel at level k is determined   ⟶ S110

The user equipment at level i sends the preamble on the resource of the Physical Random Access Channel at level k according to the determined power control mode   ⟶ S120 is the maximum transmitted power of the user equipment; or mode three: the transmitted power of the preamble of the PRACH at level k is the maximum transmitted power of a user equipment corresponding to level k.

19 Claims, 6 Drawing Sheets

(51) Int. Cl.
     *H04W 52/36*     (2009.01)
     *H04W 74/08*     (2009.01)

(56) References Cited

FOREIGN PATENT DOCUMENTS

| CN | 105992328 A | 10/2016 |
|---|---|---|
| WO | 2014021589 A1 | 2/2014 |
| WO | 2017134556 A1 | 8/2017 |

OTHER PUBLICATIONS

HiSilicon, "PRACH Transmission Power Setting", 3GPP TSG RAN WG1 Meeting #80bis, Belgrade, Serbia, Apr. 20-24, 2015.
Chinese Office Action for corresponding application 2017106878121; Report dated Nov. 12, 2020.
Chinese Search Report for corresponding application 2017106878121; Report dated Nov. 12, 2020.

* cited by examiner

POWER CONTROL METHOD AND APPARATUS

CROSS-REFERENCE TO RELATED APPLICATIONS

This application is a National Stage application of International Patent Application PCT/CN2018/099927 filed on Aug. 10, 2018, which claims priority to Chinese patent application No. 201710687812.1 filed with the Patent Office of the People's Republic of China on Aug. 11, 2017, contents of both of which are incorporated herein by reference in their entireties.

TECHNICAL FIELD

The present disclosure relates to the technical field of wireless communications and, for example, a power control method and apparatus.

BACKGROUND

To meet the needs of the Cellular Internet of Things (C-IoT), a new access system of the NarrowBand-Cellular Internet of Things (NB-IoT) is proposed at the 3rd Generation Partnership Project (3GPP) 69th plenary meeting. The NB-IoT system focuses on low-complexity and low-throughput radio frequency access technologies. The research goals of the NB-IoT system include improved indoor coverage, support to a huge amount of low-throughput user equipment, lower latency sensitivity, ultra-low equipment costs, a low equipment power loss, and network architecture. Both the uplink transmission bandwidth and the downlink transmission bandwidth of the NB-IoT system are 180 kHz. The bandwidth of 180 kHz is equal to the bandwidth of one physical resource block (PRB) of the Long-Term Evolution (LTE) system, facilitating reuse of related designs of the LTE system in the NB-IoT system. In addition, the NB-IoT system supports three different operation modes: (1) stand-alone operation, such as replacement of one or more Global System for Mobile Communications (GSM) carriers by frequency spectrums used by the GSM EDGE Radio Access Network (GERAN) system having an enhanced data rate; (2) guard band operation, such as use of unused resource blocks within a range of one LTE carrier guard band; and (3) in-band operation, such as use of resource blocks within a range of one normal LTE carrier.

A system supporting coverage enhancement (CE) may support configuration of one or more CE levels, each CE level corresponding to one CE target value range. For example, one system supports at most three CE levels: CE level 0, CE level 1 and CE level 2, where the coupling loss (CL) corresponding to CE level 0 is less than or equal to 144 dB, the CL corresponding to CE level 1 satisfies 144 dB<CL≤154 dB and the CL corresponding to CE level 2 satisfies 154 dB<CL≤164 dB. Since CL=Ptx−RSRP, each CE level corresponds to one RSRP value range and a user equipment (UE) selects an appropriate CE level according to the measured RSRP. Ptx denotes the transmitted power of a reference signal and RSRP denotes Reference Signal Received Power (RSRP). Each Physical Random Access Channel (PRACH) resource set corresponds to one CE level. The UE determines a corresponding PRACH resource according to the selected CE level and sends a preamble on the PRACH resource. However, when the system randomly accesses different channels, the problem of interference between UEs having different CE levels in the related art cannot be solved.

SUMMARY

The present application provides a power control method and apparatus capable of reducing interference between user equipments having different coverage enhancement levels during random access.

An embodiment of the present application provides a power control method. The power control method includes that a user equipment at level i sends a preamble on a resource of a Physical Random Access Channel at level k according to a determined power control mode. k is greater than or equal to i. The power control mode includes at least one of the following: mode one: transmitted power of the preamble of the Physical Random Access Channel at level k is determined according to a path loss between the user equipment and a base station, maximum transmitted power, and target received power of the preamble of the Physical Random Access Channel at level k; mode two: the transmitted power of the preamble of the Physical Random Access Channel at level k is the maximum transmitted power of the user equipment; or mode three: the transmitted power of the preamble of the Physical Random Access Channel at level k is the maximum transmitted power of a user equipment corresponding to level k.

An embodiment of the present application provides a power control apparatus. The power control apparatus includes a power control mode determination module and a power control module.

The power control mode determination module is configured to determine a power control mode used by a user equipment at level i to send a preamble on a resource of a Physical Random Access Channel at level k.

The power control module is configured to instruct the user equipment at level i to send the preamble on the resource of the Physical Random Access Channel at level k according to the determined power control mode, where k is greater than or equal to i.

The power control mode includes at least one of the following: mode one: transmitted power of the preamble of the Physical Random Access Channel at level k is determined according to a path loss between the user equipment and a base station, maximum transmitted power, and target received power of the preamble of the Physical Random Access Channel at level k; mode two: the transmitted power of the preamble of the Physical Random Access Channel at level k is the maximum transmitted power of the user equipment; or mode three: the transmitted power of the preamble of the Physical Random Access Channel at level k is the maximum transmitted power of a user equipment corresponding to level k.

An embodiment of the present application provides a user equipment. The user equipment includes a memory, a processor, and a power control program stored in the memory and executable on the processor. When the power control program is executed by the processor, the following step of the power control method is performed: a user equipment at level i sends a preamble on a resource of a Physical Random Access Channel at level k according to a determined power control mode. k is greater than or equal to i.

The power control mode includes at least one of the following: mode one: transmitted power of the preamble of the Physical Random Access Channel at level k is determined according to a path loss between the user equipment and a base station, maximum transmitted power, and target received power of the preamble of the Physical Random Access Channel at level k; mode two: the transmitted power of the preamble of the Physical Random Access Channel at level k is the maximum transmitted power of the user equipment; or mode three: the transmitted power of the preamble of the Physical Random Access Channel at level k is the maximum transmitted power of a user equipment corresponding to level k.

An embodiment of the present application provides a computer-readable storage medium. A power control program is stored in the computer-readable storage medium. When the power control program is executed by a processor, the following step of the power control method is performed: a user equipment at level i sends a preamble on a resource of a Physical Random Access Channel at level k according to a determined power control mode. k is greater than or equal to i.

The power control mode includes at least one of the following: mode one: transmitted power of the preamble of the Physical Random Access Channel at level k is determined according to a path loss between the user equipment and a base station, maximum transmitted power, and target received power of the preamble of the Physical Random Access Channel at level k; mode two: the transmitted power of the preamble of the Physical Random Access Channel at level k is the maximum transmitted power of the user equipment; or mode three: the transmitted power of the preamble of the Physical Random Access Channel at level k is the maximum transmitted power of a user equipment corresponding to level k.

An embodiment of the present application provides a power control method. The power control method includes that at least two maximum transmitted power values are configured, and when a preset condition is satisfied, a user equipment sends an uplink channel by using one of the at least two maximum transmitted power values.

An embodiment of the present application provides a power control apparatus. The power control apparatus includes a configuration module and a power control module.

The configuration module is configured to configure at least two maximum transmitted power values.

The power control module is configured to, when a preset condition is satisfied, instruct a user equipment to send an uplink channel by using one of the at least two maximum transmitted power values.

An embodiment of the present application provides a user equipment. The user equipment includes a memory, a processor, and a power control program stored in the memory and executable on the processor. When the power control program is executed by the processor, the following steps of the power control method are performed: at least two maximum transmitted power values are configured, and when a preset condition is satisfied, a user equipment sends an uplink channel by using one of the at least two maximum transmitted power values.

An embodiment of the present application provides a computer-readable storage medium. A power control program is stored in the computer-readable storage medium. When the power control program is executed by a processor, the following steps of the power control method are performed: at least two maximum transmitted power values are configured, and when a preset condition is satisfied, a user equipment sends an uplink channel by using one of the at least two maximum transmitted power values.

DETAILED DESCRIPTION

Figure 1:
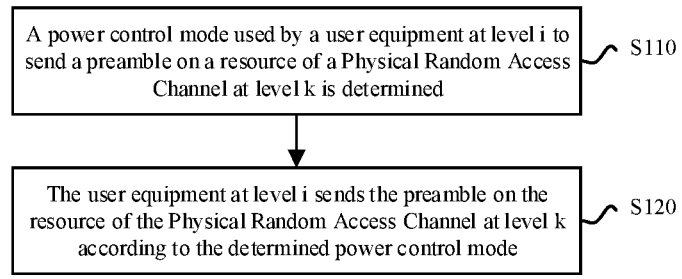
FIG. 1 is a flowchart of a power control method according to embodiment one of the present application.

Embodiments of the present application will be described in detail in conjunction with drawings. If not in collision, the embodiments described herein and the features thereof may be combined with each other.

Each Physical Random Access Channel (PRACH) resource set corresponds to one CE level. The UE determines a corresponding PRACH resource according to the selected CE level and sends a preamble on the PRACH resource. The preamble at CE level 0 can be sent according to a predetermined power control (PC) mode. In the predetermined power control mode, the transmitted power may be determined using the following formula (1-1):

$$P_{PRACH} = \min \{P_{CMAX}, P_{PREAMBLE\_RECEIVED\_TARGET\_POWER} + PL\} \quad (1\text{-}1)$$

$P_{CMAX}$ denotes the maximum transmitted power of the UE. $P_{PREAMBLE\_RECEIVED\_TARGET\_POWER}$ denotes the target received power of the preamble. PL denotes an estimated path loss.

$P_{PREAMBLE\_RECEIVED\_TARGET\_POWER}$ may be determined using the following formula (1-2):

$$P_{PREAMBLE\_RECEIVED\_TARGET\_POWER} = \\ P_{PREAMBLE\_RECEIVED\_TARGET\_POWER\_INITIAL} + \\ P_{DELTA\_PREAMBLE} + \\ (C_{PREAMBLE\_TRANSMISSION\_COUNTER} - 1) \times \\ S_{POWER\_RAMPING\_STEP} \quad (1\text{-}2)$$

$P_{DELTA\_PREAMBLE}$ denotes a configuration parameter. $P_{PREAMBLE\_RECEIVED\_TARGET\_POWER\_INITIAL}$ denotes an initial preamble target received power. $C_{PREAMBLE\_TRANSMISSION\_COUNTER}$ denotes a counter for the number of attempts to send the preamble. When the preamble is sent for the first time, $C_{PREAMBLE\_TRANSMISSION\_COUNTER}$ is set to 1. $S_{POWER\_RAMPING\_STEP}$ denotes a power ramp step.

In the case where the preamble is sent for multiple times, before the preamble is sent for the first time, calculation is performed using formula (1-2) so that the original $P_{PREAMBLE\_RECEIVED\_TARGET\_POWER}$ is obtained, then the original $P_{PREAMBLE\_RECEIVED\_TARGET\_POWER}$ is adjusted using formula (1-3) so that $P_{PREAMBLE\_RECEIVED\_TARGET\_POWER}$ is obtained, and finally, the obtained value of $P_{PREAMBLE\_RECEIVED\_TARGET\_POWER}$ is taken as a new value of $P_{PREAMBLE\_RECEIVED\_TARGET\_POWER}$ and is substituted into formula (1-1) so that $P_{PREAMBLE\_RECEIVED\_TARGET\_POWER}$ is calculated.

$$P_{PREAMBLE\_RECEIVED\_TARGET\_POWER} = P_{PREAMBLE\_RECEIVED\_TARGET\_POWER} - 10 \times \log_{10} N_{REPETITION\_PER\_PREAMBLE\_ATTEMPT} \quad (1\text{-}3)$$

$N_{REPETITION\_PER\_PREAMBLE\_ATTEMPT}$ denotes the number of repetition times for which the preamble is sent.

When the UE attempts to send the preamble for $N_x$ ($N_x$ is greater than or equal to 1) times on the PRACH resource corresponding to CE level x ($x \geq 0$) and fails to access the system according to a predetermined random access process, the UE needs to send the preamble on the PRACH resource corresponding to CE level (x+1).

For an uplink traffic channel (such as Physical Uplink Shared Channel (PUSCH)), when the number of repetition times is equal to 1, the transmitted power of the PUSCH is determined by a predetermined power control formula; when the number of repetition times is greater than or equal to 2, the transmitted power of the PUSCH needs to be configured according to $P_{CMAX}$.

In the preceding power control scheme, three problems as described below exist.

(1) When a base station detects a random access signal (PRACH signal), also known as a random access preamble signal (PRACH preamble signal), sent by multiple UEs, a preamble with higher received power affects detection of a preamble with lower received power although the two preambles are sent on different frequency resources (for example, adjacent subcarriers).

(2) When coverage enhancement is supported, the system supports configuration of one or more PRACH resource sets and each PRACH resource set corresponds to one coverage enhancement level. Each UE selects a corresponding PRACH resource according to a selected coverage enhancement level and sends a preamble on the corresponding PRACH resource. When a UE at a low coverage enhancement level sends a preamble to a PRACH resource at a high coverage enhancement level for some reasons, strong interference is caused to a preamble sent by a UE at a high coverage enhancement level, severely affecting the detection performance of the preamble of the UE at a high coverage enhancement level.

(3) When repeatedly sent for two or more times, an uplink traffic channel (such as PUSCH) needs to be sent according to $P_{MAX}$. In a Small Cell scenario where a cell has a small coverage area, if the preceding PUSCH transmission scheme is used, large co-channel interference occurs between PUSCHs of adjacent cells, thereby affecting the reception of the PUSCHs.

Embodiment One

As shown in FIG. 1, an embodiment of the present application provides a power control method. The method includes the steps described below.

In step S110, a power control mode used by a user equipment at level i to send a preamble on a resource of a Physical Random Access Channel at level k is determined.

In step S210, the user equipment at level i sends the preamble on the resource of the Physical Random Access Channel at level k according to the determined power control mode.

k is greater than or equal to i.

The power control mode includes at least one of the following: mode one: transmitted power of the preamble of the Physical Random Access Channel at level k is determined according to a path loss between the user equipment and a base station, maximum transmitted power, and target received power of the preamble of the Physical Random Access Channel at level k; mode two: the transmitted power of the preamble of the Physical Random Access Channel at level k is the maximum transmitted power of the user equipment; or mode three: the transmitted power of the preamble of the Physical Random Access Channel at level k is the maximum transmitted power of a user equipment corresponding to level k.

The method may further include the features described below.

In an embodiment, the level may be at least one of a coverage enhancement level and a sending repetition level.

The UE at level i may send the preamble on the PRACH resource at level k ($k \geq i$). In addition, the greater the value of level i, the more serious the channel fading between the UE and the base station, the greater the coverage enhancement required, and the more the number of retransmissions of the corresponding Physical Random Access Channel.

The maximum transmitted power of the user equipment is a value uniformly configured for one cell.

The maximum transmitted power $P_{CMAX,K}$ of the user equipment corresponding to level k is a value uniformly configured for one coverage enhancement level in one cell.

In an embodiment, in the power control mode of mode one, the transmitted power may be determined using the following formula (2-1):

$$P_{PRACH} = \min\{P_{CMAX}, P_{PREAMBLE\_RECEIVED\_TARGET\_POWER} + PL\} \quad (2\text{-}1)$$

$P_{CMAX}$ denotes the maximum transmitted power. $P_{PREAMBLE\_RECEIVED\_TARGET\_POWER}$ denotes the target received power of the preamble. PL denotes an estimated path loss. $P_{CMAX}$ denotes the maximum transmitted power of the UE, where the maximum transmitted power of the UE may be uniformly configured or may correspond to one coverage enhancement level.

$P_{PREAMBLE\_RECEIVED\_TARGET\_POWER}$ may be determined using the following formula (2-2):

$$P_{PREAMBLE\_RECEIVED\_TARGET\_POWER} = P_{PREAMBLE\_RECEIVED\_TARGET\_POWER\_INITIAL} + P_{DELTA\_PREAMBLE} + (C_{PREAMBLE\_TRANSMISSION\_COUNTER} - 1) \times S_{POWER\_RAMPING\_STEP} \quad (2\text{-}2)$$

$P_{DELTA\_PREAMBLE}$ denotes a configuration parameter. $P_{PREAMBLE\_RECEIVED\_TARGET\_POWER\_INITIAL}$ denotes an initial preamble target received power. $C_{PREAMBLE\_TRANSMISSION\_COUNTER}$ denotes a counter for the number of attempts to send the preamble. When the preamble is sent for the first time, $C_{PREAMBLE\_TRANSMISSION\_COUNTER}$ is set to 1. $S_{POWER\_RAMPING\_STEP}$ denotes a power ramp step.

In the case where the preamble is sent for multiple times, before the preamble is sent for the first time, calculation is performed using formula (2-2) so that the original $P_{PREAMBLE\_RECEIVED\_TARGET\_POWER}$ is obtained, then the original $P_{PREAMBLE\_RECEIVED\_TARGET\_POWER}$ is adjusted using formula (2-3) so that $P_{PREAMBLE\_RECEIVED\_TARGET\_POWER}$ is obtained, and finally, the value of $P_{PREAMBLE\_RECEIVED\_TARGET\_POWER}$ as the value of the new $P_{PREAMBLE\_RECEIVED\_TARGET\_POWER}$ is substituted into formula (2-1) so that $P_{PREAMBLE\_RECEIVED\_TARGET\_POWER}$ is calculated.

$$P_{PREAMBLE\_RECEIVED\_TARGET\_POWER} = P_{PREAMBLE\_RECEIVED\_TARGET\_POWER} - 10 \times \log_{10} N_{REPETITION\_PER\_PREAMBLE\_ATTEMPT} \quad (2\text{-}3)$$

$N_{REPETITION\_PER\_PREAMBLE\_ATTEMPT}$ denotes the number of repetition times for which the preamble is sent.

In an embodiment, the user equipment at level i sends the preamble on the resource of the Physical Random Access Channel at level k according to the determined power control mode in the following manner: the user equipment at level i attempts to send the preamble on the resource of the Physical Random Access Channel at level k for $N_k$ times. $N_k$ is greater than or equal to 1. $N_k$ denotes the upper limit of the number of times for which the preamble is sent on the Physical Random Access Channel at level k.

In an embodiment, a Physical Random Access Channel at each level is separately configured with the upper limit of the number of times for which the preamble is sent.

In an embodiment, during $N_k$ attempts to send the preamble, the power control mode of mode one is used for Y1 times and the power control mode of mode two or mode three is used for Y2 times. Y1 is greater than or equal to 0 and Y2 is greater than or equal to 0.

In an embodiment, mode one is used for Y1 times and then mode two or mode three is used for Y2 times.

In an embodiment, a difference of two levels is between level k and level i, where k=i+2.

In an embodiment, the user equipment at level i sends the preamble on the resource of the Physical Random Access Channel at level k according to the determined power control mode in the following manner: the user equipment at level i performs at least one of the following processing modes: when k=i, the user equipment at level i sends the preamble on the resource of the Physical Random Access Channel at level k by using the power control mode of mode one; when k=i+1, the user equipment at level i sends the preamble on the resource of the Physical Random Access Channel at level k by using the power control mode of mode two; or when k=i+2, the user equipment at level i sends the preamble on the resource of the Physical Random Access Channel at level k by using the power control mode of mode three.

In an embodiment, the user equipment at level i sends the preamble on the resource of the Physical Random Access Channel at level k according to the determined power control mode in the following manner: the user equipment at level i performs at least one of the following processing modes: when k=i, the user equipment at level i sends the preamble on the resource of the Physical Random Access Channel at level k by using the power control mode of mode one; when k=i+1, the user equipment at level i sends the preamble on the resource of the Physical Random Access Channel at level k by using the power control mode of mode three; or when k=i+2, the user equipment at level i sends the preamble on the resource of the Physical Random Access Channel at level k by using the power control mode of mode three.

In an embodiment, the user equipment at level i sends the preamble on the resource of the Physical Random Access Channel at level k according to the determined power control mode in the following manner: when the user equipment at level i satisfies at least one of a first type of condition, the user equipment at level i is prohibited from sending the preamble on a resource of a Physical Random Access Channel at level j, where j is greater than i; or the user equipment at level i is allowed to send the preamble on a resource of a Physical Random Access Channel at level i.

In an embodiment, the user equipment at level i sends the preamble on the resource of the Physical Random Access Channel at level k according to the determined power control mode in the following manner: when the user equipment at level i satisfies at least one of a first type of condition, the user equipment at level i performs at least one of the following processing modes: the preamble is sent on the resource of the Physical Random Access Channel at level k by using the power control mode of mode one, where k=0; the preamble is sent on the resource of the Physical Random Access Channel at level k by using the power control mode of mode two, where k=1; or the preamble is sent on the resource of the Physical Random Access Channel at level k by using the power control mode of mode three, where k=2.

In an embodiment, the user equipment at level i sends the preamble on the resource of the Physical Random Access Channel at level k according to the determined power control mode in the following manner: when the user equipment at level i satisfies at least one of a first type of condition, the user equipment at level i performs at least one of the following processing modes: the preamble is sent on the resource of the Physical Random Access Channel at level k by using the power control mode of mode one, where k=0; the preamble is sent on the resource of the Physical Random Access Channel at level k by using the power control mode of mode one, mode two or mode three, where k=1; or $N_k$ attempts are made to send the preamble on the resource of the Physical Random Access Channel at level k, where the preamble is sent for Y1 times by using the power control mode of mode one and the preamble is sent for Y2 times by using the power control mode of mode two or mode three, where Y1≥0, Y2≥0 and k=1; or the preamble is prohibited from being sent on the resource of the Physical Random Access Channel at level k, where k=2.

In an embodiment, the user equipment at level i sends the preamble on the resource of the Physical Random Access Channel at level k according to the determined power control mode in the following manner: when the user equipment at level i satisfies at least one of a first type of condition, the user equipment at level i performs at least one of the following processing modes: the preamble is sent on the resource of the Physical Random Access Channel at level k by using the power control mode of mode one, where k=0; the preamble is sent on the resource of the Physical Random Access Channel at level k by using the power control mode of mode one, mode two or mode three, where k=1; or $N_k$ attempts are made to send the preamble on the resource of the Physical Random Access Channel at level k, where the preamble is sent for Y1 times by using the power control mode of mode one and the preamble is sent for Y2 times by using the power control mode of mode two or mode three, where Y1≥0, Y2≥0 and k=1; or the preamble is sent on the resource of the Physical Random Access Channel at level k by using the power control mode of mode one, mode two or mode three, where k=2; or $N_k$ attempts are made to send the preamble on the resource of the Physical Random Access Channel at level k, where the preamble is sent for Y1 times by using the power control mode of mode one and the preamble is sent for Y2 times by using the power control mode of mode two or mode three, where Y1≥0, Y2≥0 and k=2.

In an embodiment, the first type of condition includes at least one of the following: a coupling loss (CL) satisfies CL≥MCL_0−Delta_0_CL; Reference Signal Received Power (RSRP) satisfies RSRP≥MRSRP_0+Delta_0_RSRP; or a path loss (PL) satisfies PL≥MPL_0−Delta_0_PL. MCL_0 denotes the threshold of the CL corresponding to level 0, MRSRP_0 denotes the threshold of the RSRP corresponding to level 0 and MPL_0 denotes the threshold of the PL corresponding to level 0; and Delta_0_CL. Delta_0_RSRP and Delta_0_PL are offsets.

In an embodiment, Delta_0_CL denotes a measurement error of the CL corresponding to level 0, Delta_0_RSRP denotes a measurement error of the RSRP corresponding to level 0 and Delta_0_PL denotes a measurement error of the PL corresponding to level 0.

In an embodiment, the value of level i of the user equipment at level i satisfies i=0.

In an embodiment, the user equipment at level i sends the preamble on the resource of the Physical Random Access Channel at level k according to the determined power control mode in the following manner: when the user equipment at level i satisfies at least one of a second type of condition, the user equipment at level i performs at least one of the following processing modes: the preamble is sent on a resource of a Physical Random Access Channel at level i; the number of attempts made by the user equipment at level i to send the preamble on the resource of the Physical Random Access Channel at level i is reset to an initial value; the user equipment at level i reconfigures a power ramp step; or a counter for the number of attempts made by the user equipment at level i to send the preamble on the resource of the Physical Random Access Channel at level i is increased by one; or when the user equipment at level i satisfies at least one of a second type of condition, the user equipment at level i performs at least one of the following processing modes: the preamble is sent on a resource of a Physical Random Access Channel at level i+1; or the user equipment at level i reconfigures the power ramp step.

The action of resetting the number of attempts made by the user equipment at level i to send the preamble on the resource of the Physical Random Access Channel at level i to the initial value is the action of resetting $C_{PREAMBLE\_TRANSMISSION\_COUNTER}$ (the counter for the number of attempts to send the preamble) in power control formula (2-1) in mode one to 1.

When the UE sends the preamble for the first time on the resource of the Physical Random Access Channel at level i, the counter=1; when the UE satisfies the second type of condition and sends the preamble again on the resource of the Physical Random Access Channel at level i, the counter is increased by one, that is, the counter=2; when the UE satisfies the second type of condition again and sends the preamble again on the resource of the Physical Random Access Channel at level i, the counter is increased by one, that is, the counter=3. The rest can be done in the same manner.

In an embodiment, the user equipment at level i reconfigures the power ramp step in the following manner: each user equipment configures the power ramp step separately.

In an embodiment, the second type of condition includes at least one of the following: after the number of attempts to send the preamble on the resource of the Physical Random Access Channel at level i reaches an upper limit $N_i$, a random access process fails; after transmitted power used by the user equipment at level i to send the preamble on the resource of the Physical Random Access Channel at level i reaches the maximum transmitted power of the user equipment, the random access process fails; or after the transmitted power used by the user equipment at level i to send the preamble on the resource of the Physical Random Access Channel at level i reaches the maximum transmitted power of a user equipment corresponding to level i, the random access process fails.

In an embodiment, when the counter for the number of attempts made by the user equipment at level i to send the preamble on the resource of the Physical Random Access Channel at level i reaches M and the user equipment at level i satisfies the second type of condition, the preamble is sent on the resource of the Physical Random Access Channel at level i+1, where M is greater than or equal to 1. The value of M is configured for the terminal by the base station; or the value of M is stored in the terminal according to the default configuration.

In an embodiment, the user equipment at level i sends the preamble on the resource of the Physical Random Access Channel at level k according to the determined power control mode in the following manner: when the user equipment at level i satisfies at least one of a second type of condition, the user equipment at level i performs at least one of the following processing modes: a second type of random access process is used; the preamble is sent on a resource of a Physical Random Access Channel at level i; the number of attempts made by the user equipment at level i to send the preamble on the resource of the Physical Random Access Channel at level i is reset to an initial value; the user equipment at level i reconfigures a power ramp step; or a counter for the number of attempts made by the user equipment at level i to send the preamble on the resource of the Physical Random Access Channel at level i is increased by one. The random access process used by the user equipment at level i in the corresponding second type of condition is a first type of random access process. The first type of random access process and the second type of random access process include at least four steps described below.

In step 1, the user equipment sends the preamble on the resource of the Physical Random Access Channel.

In step 2, the base station sends a random access response message to respond to the preamble sent by the user equipment.

In step 3, the user equipment sends an Msg3 message to the base station.

In step 4, the base station sends an Msg4 message to the user equipment.

This paragraph describes the functions of the Msg3 message and the Msg4 message. In the system, when the UE receives the random access response message and acquires uplink time synchronization and uplink resources, since different UEs may send the same preamble on the same time-frequency resource, the UE does not know whether the random access response message is sent to the UE itself or sent to other UEs. For this reason, the UE needs to solve such random access collision through subsequent Msg3 message and Msg4 message. The Msg3 message is also called a collision detection message and the Msg4 message is also called a collision detection response message.

Msg3 is the first message transmitted on the PUSCH on the basis of uplink scheduling and by use of a hybrid automatic repeat request (HARQ) mechanism. In the initial random access process, an RRC layer connection request message (RRC Connection Request) is transmitted in Msg3. If different UEs receive the same random access response message, the UEs acquire the same uplink resources and send the Msg3. To distinguish between different UEs, a UE-specific ID is carried in Msg3. In the case of initial access, this ID may be the S-TMSI (if any) of the UE or a randomly generated 40-bit value.

Upon sending the Msg3 message, the UE starts the contention cancellation timer immediately. (The UE restart this timer upon each subsequent retransmission of Msg3.) During this time, the UE needs to listen to the collision detection response message (Contention Resolution, Msg4) returned to the UE by the eNodeB.

Msg3 in the first type of random access process further includes uplink data (or uplink traffic) information that the UE needs to transmit. Msg3 in the second type of random access process does not include uplink data (or uplink traffic) information that the UE needs to transmit.

In an embodiment, the user equipment at level i sends the preamble on the resource of the Physical Random Access Channel at level k according to the determined power control mode in the following manner: when the user equipment at level i satisfies at least one of a third type of condition, the user equipment at level i performs at least one of the following processing modes: the preamble is sent on a resource of a Physical Random Access Channel at level i; the number of attempts made by the user equipment at level i to send the preamble on the resource of the Physical Random Access Channel at level i continues being counted; the user equipment at level i reconfigures a power ramp step; or a counter for the number of attempts made by the user equipment at level i to send the preamble on the resource of the Physical Random Access Channel at level i is increased by one.

The action of continuing counting the number of attempts made by the user equipment at level i to send the preamble on the resource of the Physical Random Access Channel at level i means that the number of attempts to send the preamble may exceed the upper limit $N_i$ of the number of attempts to send the preamble on the resource of the Physical Random Access Channel at level i and continue being accumulated.

In an embodiment, the user equipment at level i reconfigures the power ramp step in the following manner: each user equipment configures the power ramp step separately.

In an embodiment, the third type of condition includes at least one of the following: after the number of attempts to send the preamble on the resource of the Physical Random Access Channel at level i reaches an upper limit $N_i$, but transmitted power used by the user equipment at level i to send the preamble on the resource of the Physical Random Access Channel at level i does not reach the maximum transmitted power of the user equipment, a random access process fails; or after the number of attempts to send the preamble on the resource of the Physical Random Access Channel at level i reaches the upper limit $N_i$, but the transmitted power used by the user equipment at level i to send the preamble on the resource of the Physical Random Access Channel at level i does not reach a maximum transmitted power of a user equipment corresponding to level i, the random access process fails.

In an embodiment, the user equipment at level i sends the preamble on the resource of the Physical Random Access Channel at level k according to the determined power control mode in the following manner: when the user equipment at level i satisfies the third type of condition, the user equipment at level i sends the preamble on the resource of the Physical Random Access Channel at level i; and when transmitted power used by the user equipment at level i to send the preamble on the resource of the Physical Random Access Channel at level i is the maximum transmitted power of a user equipment corresponding to level i and a random access process fails, the user equipment at level i performs at least one of the following processing modes: the preamble is sent on the resource of the Physical Random Access Channel at level i; the number of attempts made by the user equipment at level i to send the preamble on the resource of the Physical Random Access Channel at level i is reset to an initial value; the user equipment at level i reconfigures the power ramp step; or the counter for the number of attempts made by the user equipment at level i to send the preamble on the resource of the Physical Random Access Channel at level i is increased by one.

In an embodiment, when the counter for the number of attempts made by the user equipment at level i to send the preamble on the resource of the Physical Random Access Channel at level i reaches M and the user equipment satisfies the third type of condition, the preamble is sent on the resource of the Physical Random Access Channel at level i+1, where M is greater than or equal to 1.

In an embodiment, the user equipment at level i sends the preamble on the resource of the Physical Random Access Channel at level k according to the determined power control mode in the following manner: when the user equipment at level i satisfies at least one of a fourth type of condition, the user equipment at level i performs at least one of the following processing modes: the preamble is sent on a resource of a Physical Random Access Channel at level i; the number of attempts made by the user equipment at level i to send the preamble on the resource of the Physical Random Access Channel at level i is reset to an initial value; the user equipment at level i reconfigures a power ramp step; or a counter for the number of attempts made by the user equipment at level i to send the preamble on the resource of the Physical Random Access Channel at level i is increased by one; or when the user equipment at level i satisfies at least one of a fourth type of condition, the user equipment at level i performs at least one of the following processing modes: the preamble is sent on a resource of a Physical Random Access Channel at level i+1; or the user equipment at level i reconfigures the power ramp step.

In an embodiment, the user equipment at level i reconfigures the power ramp step in the following manner: each user equipment configures the power ramp step separately.

In an embodiment, the fourth type of condition includes at least one of the following: after transmitted power used by the user equipment at level i to send the preamble on the resource of the Physical Random Access Channel at level i reaches the maximum transmitted power of the user equipment, a random access process fails; or after the transmitted power used by the user equipment at level i to send the preamble on the resource of the Physical Random Access Channel at level i reaches the maximum transmitted power of a user equipment corresponding to level i, the random access process fails.

In an embodiment, when the counter for the number of attempts made by the user equipment at level i to send the preamble on the resource of the Physical Random Access Channel at level i reaches M and the user equipment satisfies the fourth type of condition, the preamble is sent on a resource of a Physical Random Access Channel at level i+1, where M is greater than or equal to 1.

In an embodiment, the value of level i of the user equipment at level i satisfies i=0.

In an embodiment, the user equipment further satisfies a fifth type of condition, where the fifth type of condition includes at least one of the following: a coupling loss (CL) satisfies CL≥MCL_0−Delta_0_CL; Reference Signal Received Power (RSRP) satisfies RSRP≥MRSRP_0+Delta_0_RSRP; or a path loss (PL) satisfies PL≤MPL_0−Delta_0_PL_MCL_0 denotes the threshold of the CL corresponding to level 0, MRSRP_0 denotes the threshold of the RSRP corresponding to level 0 and MPL_0 denotes the threshold of the PL corresponding to level 0; and Delta_0_CL, Delta_0_RSRP and Delta_0_PL are offsets.

In an embodiment, Delta_0_CL denotes a measurement error of the CL corresponding to level 0, Delta_0_RSRP denotes a measurement error of the RSRP corresponding to level 0 and Delta_0_PL denotes a measurement error of the PL corresponding to level 0.

In an embodiment, the user equipment at level i sends the preamble on the resource of the Physical Random Access Channel at level k according to the determined power control mode in the following manner: when the user equipment at level i satisfies at least one of a sixth type of condition, the user equipment at level i performs at least one of the following processing modes: the preamble is sent on the resource of the Physical Random Access Channel at level k by using the power control mode of mode one, where k=0; the preamble is sent on the resource of the Physical Random Access Channel at level k by using the power control mode of mode two, where k=1; or $N_k$ attempts are made to send the preamble on the resource of the Physical Random Access Channel at level k, where the preamble is sent for Y1 times by using the power control mode of mode one and the preamble is sent for Y2 times by using the power control mode of mode two or mode three, where Y1≥0, Y2≥0 and k=1; or the preamble is sent on the resource of the Physical Random Access Channel at level k by using the power control mode of mode three, where k=2; or $N_k$ attempts are made to send the preamble on the resource of the Physical Random Access Channel at level k, where the preamble is sent for Y1 times by using the power control mode of mode one and the preamble is sent for Y2 times by using the power control mode of mode two or mode three, where Y1≥0, Y2≥0 and k=2.

In an embodiment, the sixth type of condition includes at least one of the following: a coupling loss (CL) satisfies CL≥MCL_0−Delta_0_CL; Reference Signal Received Power (RSRP) satisfies RSRP≥MRSRP_0+Delta_0_RSRP; or a path loss (PL) satisfies PL≤MPL_0−Delta_0_PL. MCL_0 denotes the threshold of the CL corresponding to level 0, MRSRP_0 denotes the threshold of the RSRP corresponding to level 0 and MPL_0 denotes the threshold of the PL corresponding to level 0; and Delta_0_CL, Delta_0_RSRP and Delta_0_PL are offsets.

In an embodiment, Delta_0_CL denotes a measurement error of the CL corresponding to level 0, Delta_0_RSRP denotes a measurement error of the RSRP corresponding to level 0 and Delta_0_PL denotes a measurement error of the PL corresponding to level 0.

In an embodiment, the maximum number of attempts to send the preamble on the resource of the Physical Random Access Channel at level i is configured for the first user equipment at level i that satisfies the fifth type of condition and the second user equipment at level i that satisfies the sixth type of condition separately.

The power control method provided in this embodiment of the present application is capable of reducing interference between user equipments having different coverage enhancement levels during random access.

Embodiment Two

Figure 2:
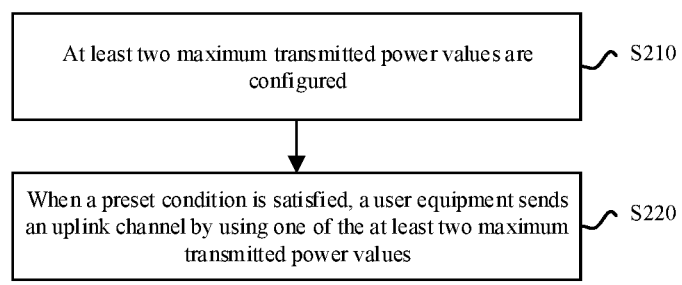
FIG. 2 is a flowchart of a power control method according to embodiment two of the present application.

As shown in FIG. 2, an embodiment of the present application provides a power control method. The method includes steps S210 and S220.

In step S210, at least two maximum transmitted power values are configured.

In step S220, when a preset condition is satisfied, a user equipment sends an uplink channel by using one of the at least two maximum transmitted power values.

The method further includes that, in an embodiment, the uplink channel includes at least one of the following channels: an uplink data channel, a random access channel or a scheduling request channel.

In an embodiment, the preset condition includes at least one of the following: the number N of repeated transmissions of the uplink channel is greater than or equal to a threshold Nth; the level index i of the user equipment is greater than or equal to an index threshold A; or the sending repetition level j of the uplink channel is greater than or equal to a repetition level threshold B.

One sending repetition level corresponds to one number of repetition times. The value of the threshold Nth is set by the base station or is a default value. The value of the index threshold A is set by the base station or is a default value. The value of the repetition level threshold B is set by the base station or is a default value.

In an embodiment, the at least two maximum transmitted power values are configured in the following manner: a first maximum transmitted power value and a second maximum transmitted power value are configured.

When the preset condition is satisfied, the user equipment sends the uplink channel by using one of the maximum transmitted power values in the following manner: the user equipment sends the uplink channel by using the second maximum transmitted power value. The first maximum transmitted power value is uniformly configured for one cell. The second maximum transmitted power value is configured for each coverage enhancement level separately and/or configured for each user equipment separately.

In an embodiment, the second maximum transmitted power value is greater than or equal to the first maximum transmitted power value.

For example, when the number of coverage enhancement levels is 3 (CE level 0, CE level 1 and CE level 2), the index threshold A may be set to 2, that is, the UE at level i (level i=2) sends the uplink channel according to the second maximum transmitted power value.

Embodiment Three

Figure 3:
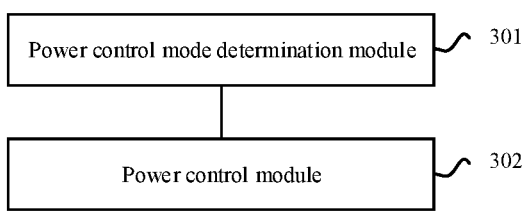
FIG. 3 is a schematic diagram of a power control apparatus according to embodiment three of the present application.

As shown in FIG. 3, an embodiment of the present application provides a power control apparatus. The power control apparatus includes a power control mode determination module 301 and a power control module 302.

The power control mode determination module 301 is configured to determine a power control mode used by a user equipment at level i to send a preamble on a resource of a Physical Random Access Channel at level k.

The power control module 302 is configured to instruct the user equipment at level i to send the preamble on the resource of the Physical Random Access Channel at level k according to the determined power control mode, where k is greater than or equal to i.

The power control mode includes at least one of the following: mode one: transmitted power of the preamble of the Physical Random Access Channel at level k is determined according to a path loss between the user equipment and a base station, maximum transmitted power, and target received power of the preamble of the Physical Random Access Channel at level k; mode two: the transmitted power of the preamble of the Physical Random Access Channel at level k is the maximum transmitted power of the user equipment; or mode three: the transmitted power of the preamble of the Physical Random Access Channel at level k is the maximum transmitted power of a user equipment corresponding to level k.

In an embodiment, the power control module is configured to instruct the user equipment at level i to send the preamble on the resource of the Physical Random Access Channel at level k according to the determined power control mode in the following manner: the user equipment at level i attempts to send the preamble on the resource of the Physical Random Access Channel at level k for $N_k$ times. $N_k$ is greater than or equal to 1. $N_k$ denotes the upper limit of the number of times for which the preamble is sent on the Physical Random Access Channel at level k.

In an embodiment, the power control module is further configured to instruct that a Physical Random Access Channel at each level be separately configured with the upper limit of the number of times for which the preamble is sent.

In an embodiment, during $N_k$ attempts to send the preamble, the power control mode of mode one is used for Y1 times and the power control mode of mode two or mode three is used for Y2 times. Y1 is greater than or equal to 0 and Y2 is greater than or equal to 0.

In an embodiment, a difference of two levels is between level k and level i, where k=i+2.

In an embodiment, the power control module is configured to instruct the user equipment at level i to send the preamble on the resource of the Physical Random Access Channel at level k according to the determined power control mode in the following manner: the user equipment at level i performs at least one of the following processing modes: when k=i, the user equipment at level i sends the preamble on the resource of the Physical Random Access Channel at level k by using the power control mode of mode one; when k=i+1, the user equipment at level i sends the preamble on the resource of the Physical Random Access Channel at level k by using the power control mode of mode two; or when k=i+2, the user equipment at level i sends the preamble on the resource of the Physical Random Access Channel at level k by using the power control mode of mode three.

In an embodiment, the power control module is configured to instruct the user equipment at level i to send the preamble on the resource of the Physical Random Access Channel at level k according to the determined power control mode in the following manner: the user equipment at level i performs at least one of the following processing modes: when k=i, the user equipment at level i sends the preamble on the resource of the Physical Random Access Channel at level k by using the power control mode of mode one; when k=i+1, the user equipment at level i sends the preamble on the resource of the Physical Random Access Channel at level k by using the power control mode of mode three; or when k=i+2, the user equipment at level i sends the preamble on the resource of the Physical Random Access Channel at level k by using the power control mode of mode three.

In an embodiment, the power control module is configured to instruct the user equipment at level i to send the preamble on the resource of the Physical Random Access Channel at level k according to the determined power control mode in the following manner: when the user equipment at level i satisfies at least one of a first type of condition, the user equipment at level i is prohibited from sending the preamble on a resource of a Physical Random Access Channel at level j, where j is greater than i; or the user equipment at level i is allowed to send the preamble on a resource of a Physical Random Access Channel at level i.

In an embodiment, the power control module is configured to instruct the user equipment at level i to send the preamble on the resource of the Physical Random Access Channel at level k according to the determined power control mode in the following manner: when the user equipment at level i satisfies at least one of a first type of condition, the user equipment at level i performs at least one of the following processing modes: the preamble is sent on the resource of the Physical Random Access Channel at level k by using the power control mode of mode one, where k=0; the preamble is sent on the resource of the Physical Random Access Channel at level k by using the power control mode of mode two, where k=1; or the preamble is sent on the resource of the Physical Random Access Channel at level k by using the power control mode of mode three, where k=2.

In an embodiment, the power control module is configured to instruct the user equipment at level i to send the preamble on the resource of the Physical Random Access Channel at level k according to the determined power control mode in the following manner: when the user equipment at level i satisfies at least one of a first type of condition, the user equipment at level i performs at least one of the following processing modes: the preamble is sent on the resource of the Physical Random Access Channel at level k by using the power control mode of mode one, where k=0; the preamble is sent on the resource of the Physical Random Access Channel at level k by using the power control mode of mode one, mode two or mode three, where k=1; or $N_k$ attempts are made to send the preamble on the resource of the Physical Random Access Channel at level k, where the preamble is sent for Y1 times by using the power control mode of mode one and the preamble is sent for Y2 times by using the power control mode of mode two or mode three, where Y1≥0, Y2≥0 and k=1; or the preamble is prohibited from being sent on the resource of the Physical Random Access Channel at level k, where k=2.

In an embodiment, the power control module is configured to instruct the user equipment at level i to send the preamble on the resource of the Physical Random Access Channel at level k according to the determined power control mode in the following manner: when the user equipment at level i satisfies at least one of a first type of condition, the user equipment at level i performs at least one of the following processing modes: the preamble is sent on the resource of the Physical Random Access Channel at level k by using the power control mode of mode one, where k=0; the preamble is sent on the resource of the Physical Random Access Channel at level k by using the power control mode of mode one, mode two or mode three, where k=1; or $N_k$ attempts are made to send the preamble on the resource of the Physical Random Access Channel at level k, where the preamble is sent for Y1 times by using the power control mode of mode one and the preamble is sent for Y2 times by using the power control mode of mode two or mode three, where Y1≥0, Y2≥0 and k=1; or the preamble is sent on the resource of the Physical Random Access Channel at level k by using the power control mode of mode one, mode two or mode three, where k=2; or $N_k$ attempts are made to send the preamble on the resource of the Physical Random Access Channel at level k, where the preamble is sent for Y1 times by using the power control mode of mode one and the preamble is sent for Y2 times by using the power control mode of mode two or mode three, where Y1≥0, Y2≥0 and k=2.

In an embodiment, the first type of condition includes at least one of the following: a coupling loss (CL) satisfies CL≥MCL_0−Delta_0_CL; Reference Signal Received Power (RSRP) satisfies RSRP≥MRSRP_0+Delta_0_RSRP; or a path loss (PL) satisfies PL≤MPL_0−Delta_0_PL. MCL_0 denotes the threshold of the CL corresponding to level 0, MRSRP_0 denotes the threshold of the RSRP corresponding to level 0 and MPL_0 denotes the threshold of the PL corresponding to level 0; and Delta_0_CL, Delta_0_RSRP and Delta_0_PL are offsets.

In an embodiment, Delta_0_CL denotes a measurement error of the CL corresponding to level 0, Delta_0_RSRP denotes a measurement error of the RSRP corresponding to level 0 and Delta_0_PL denotes a measurement error of the PL corresponding to level 0.

In an embodiment, the value of level i of the user equipment at level i satisfies i=0.

In an embodiment, the power control module is configured to instruct the user equipment at level i to send the preamble on the resource of the Physical Random Access Channel at level k according to the determined power control mode in the following manner: when the user equipment at level i satisfies at least one of a second type of condition, the user equipment at level i performs at least one of the following processing modes: the preamble is sent on a resource of a Physical Random Access Channel at level i; the number of attempts made by the user equipment at level i to send the preamble on the resource of the Physical Random Access Channel at level i is reset to an initial value; the user equipment at level i reconfigures a power ramp step; or a counter for the number of attempts made by the user equipment at level i to send the preamble on the resource of the Physical Random Access Channel at level i is increased by one; or when the user equipment at level i satisfies the second type of condition, the user equipment at level i performs at least one of the following processing modes: the preamble is sent on a resource of a Physical Random Access Channel at level i+1; or the user equipment at level i reconfigures the power ramp step.

In an embodiment, the user equipment at level i reconfigures the power ramp step in the following manner: each user equipment configures the power ramp step separately.

In an embodiment, the second type of condition includes at least one of the following: after the number of attempts to send the preamble on the resource of the Physical Random Access Channel at level i reaches the upper limit a random access process fails; after transmitted power used by the user equipment at level i to send the preamble on the resource of the Physical Random Access Channel at level i reaches the maximum transmitted power of the user equipment, the random access process fails; or after the transmitted power used by the user equipment at level i to send the preamble on the resource of the Physical Random Access Channel at level i reaches the maximum transmitted power of a user equipment corresponding to level i, the random access process fails.

In an embodiment, when the counter for the number of attempts made by the user equipment at level i to send the preamble on the resource of the Physical Random Access Channel at level i reaches M and the user equipment at level i satisfies the second type of condition, the preamble is sent on the resource of the Physical Random Access Channel at level i+1, where M is greater than or equal to 1.

In an embodiment, the power control module is configured to instruct the user equipment at level i to send the preamble on the resource of the Physical Random Access Channel at level k according to the determined power control mode in the following manner: when the user equipment at level i satisfies at least one of a third type of condition, the user equipment at level i performs at least one of the following processing modes: the preamble is sent on a resource of a Physical Random Access Channel at level i; the number of attempts made by the user equipment at level i to send the preamble on the resource of the Physical Random Access Channel at level i continues being counted; the user equipment at level i reconfigures a power ramp step; or a counter for the number of attempts made by the user equipment at level i to send the preamble on the resource of the Physical Random Access Channel at level i is increased by one.

In an embodiment, the user equipment at level i reconfigures the power ramp step in the following manner: each user equipment configures the power ramp step separately.

In an embodiment, the third type of condition includes at least one of the following: after the number of attempts to send the preamble on the resource of the Physical Random Access Channel at level i reaches the upper limit $N_i$, but transmitted power used by the user equipment at level i to send the preamble on the resource of the Physical Random Access Channel at level i does not reach the maximum transmitted power of the user equipment, a random access process fails; or after the number of attempts to send the preamble on the resource of the Physical Random Access Channel at level i reaches the upper limit $N_i$, but the transmitted power used by the user equipment at level i to send the preamble on the resource of the Physical Random Access Channel at level i does not reach the maximum transmitted power of a user equipment corresponding to level i, the random access process fails.

In an embodiment, the user equipment at level i sends the preamble on the resource of the Physical Random Access Channel at level k according to the determined power control mode in the following manner: when the user equipment at level i satisfies the third type of condition, the user equipment at level i sends the preamble on the resource of the Physical Random Access Channel at level i; and when transmitted power used by the user equipment at level i to send the preamble on the resource of the Physical Random Access Channel at level i is the maximum transmitted power of a user equipment corresponding to level i and a random access process fails, the user equipment at level i performs at least one of the following processing modes: the preamble is sent on the resource of the Physical Random Access Channel at level i; the number of attempts made by the user equipment at level i to send the preamble on the resource of the Physical Random Access Channel at level i is reset to an initial value; the user equipment at level i reconfigures the power ramp step; or the counter for the number of attempts made by the user equipment at level i to send the preamble on the resource of the Physical Random Access Channel at level i is increased by one.

In an embodiment, when the counter for the number of attempts made by the user equipment at level i to send the preamble on the resource of the Physical Random Access Channel at level i reaches M and the user equipment satisfies the third type of condition, the preamble is sent on a resource of a Physical Random Access Channel at level i+1, where M is greater than or equal to 1.

In an embodiment, the power control module is configured to instruct the user equipment at level i to send the preamble on the resource of the Physical Random Access Channel at level k according to the determined power control mode in the following manner: when the user equipment at level i satisfies at least one of a fourth type of condition, the user equipment at level i performs at least one of the following processing modes: the preamble is sent on a resource of a Physical Random Access Channel at level i; the number of attempts made by the user equipment at level i to send the preamble on the resource of the Physical Random Access Channel at level i is reset to an initial value; the user equipment at level i reconfigures a power ramp step; or a counter for the number of attempts made by the user equipment at level i to send the preamble on the resource of the Physical Random Access Channel at level i is increased by one; or when the user equipment at level i satisfies at least one of a fourth type of condition, the user equipment at level i performs at least one of the following processing modes: the preamble is sent on a resource of a Physical Random Access Channel at level i+1; or the user equipment at level i reconfigures the power ramp step.

In an embodiment, the user equipment at level i reconfigures the power ramp step in the following manner: each user equipment configures the power ramp step separately.

In an embodiment, the fourth type of condition includes at least one of the following: after transmitted power used by the user equipment at level i to send the preamble on the resource of the Physical Random Access Channel at level i reaches the maximum transmitted power of the user equipment, a random access process fails; or after the transmitted power used by the user equipment at level i to send the preamble on the resource of the Physical Random Access Channel at level i reaches the maximum transmitted power of a user equipment corresponding to level i, the random access process fails.

In an embodiment, when the counter for the number of attempts made by the user equipment at level i to send the preamble on the resource of the Physical Random Access Channel at level i reaches M and the user equipment satisfies the fourth type of condition, the preamble is sent on the resource of the Physical Random Access Channel at level i+1, where M is greater than or equal to 1.

In an embodiment, the value of level i of the user equipment at level i satisfies i=0.

In an embodiment, the user equipment further satisfies a fifth type of condition, where the fifth type of condition includes at least one of the following: a coupling loss (CL) satisfies $CL \leq MCL\_0-Delta\_0\_CL$; Reference Signal Received Power (RSRP) satisfies $RSRP \geq MRSRP\_0+Delta\_0\_RSRP$; or a path loss (PL) satisfies $PL \leq MPL\_0-Delta\_0\_PL$. MCL_0 denotes the threshold of the CL corresponding to level 0, MRSRP_0 denotes the threshold of the RSRP corresponding to level 0 and MPL_0 denotes the threshold of the PL corresponding to level 0; and Delta_0_CL, Delta_0_RSRP and Delta_0_PL are offsets.

In an embodiment, Delta_0_CL denotes a measurement error of the CL corresponding to level 0, Delta_0_RSRP denotes a measurement error of the RSRP corresponding to level 0 and Delta_0_PL denotes a measurement error of the PL corresponding to level 0.

In an embodiment, the power control module is configured to instruct the user equipment at level i to send the preamble on the resource of the Physical Random Access Channel at level k according to the determined power control mode in the following manner: when the user equipment at level i satisfies at least one of a sixth type of condition, the user equipment at level i performs at least one of the following processing modes: the preamble is sent on the resource of the Physical Random Access Channel at level k by using the power control mode of mode one, where k=0; the preamble is sent on the resource of the Physical Random Access Channel at level k by using the power control mode of mode two, where k=1; or $N_k$ attempts are made to send the preamble on the resource of the Physical Random Access Channel at level k, where the preamble is sent for Y1 times by using the power control mode of mode one and the preamble is sent for Y2 times by using the power control mode of mode two or mode three, where Y1≥0, Y2≥0 and k=1; or the preamble is sent on the resource of the Physical Random Access Channel at level k by using the power control mode of mode three, where k=2; or $N_k$ attempts are made to send the preamble on the resource of the Physical Random Access Channel at level k, where the preamble is sent for Y1 times by using the power control mode of mode one and the preamble is sent for Y2 times by using the power control mode of mode two or mode three, where Y1≥0, Y2≥0 and k=2.

In an embodiment, the sixth type of condition includes at least one of the following: a coupling loss (CL) satisfies $CL \geq MCL\_0-Delta\_0\_CL$; Reference Signal Received Power (RSRP) satisfies $RSRP \leq MRSRP\_0+Delta\_0\_RSRP$; or a path loss (PL) satisfies $PL \geq MPL\_0-Delta\_0\_PL$. MCL_0 denotes the threshold of the CL corresponding to level 0, MRSRP_0 denotes the threshold of the RSRP corresponding to level 0 and MPL_0 denotes the threshold of the PL corresponding to level 0; and Delta_0_CL, Delta_0_RSRP and Delta_0_PL are offsets.

In an embodiment, Delta_0_CL denotes a measurement error of the CL corresponding to level 0, Delta_0_RSRP denotes a measurement error of the RSRP corresponding to level 0 and Delta_0_PL denotes a measurement error of the PL corresponding to level 0.

Embodiment Four

Figure 4:
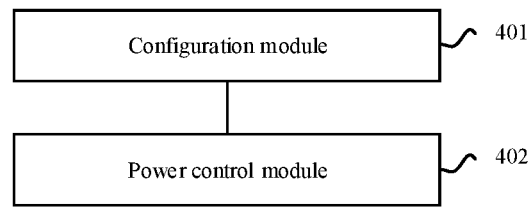
FIG. 4 is a schematic diagram of a power control apparatus according to embodiment four of the present application.

As shown in FIG. 4, an embodiment of the present application provides a power control apparatus. The power control apparatus includes a configuration module 401 and a power control module 402.

The configuration module 401 is configured to configure at least two maximum transmitted power values.

The power control module 402 is configured to, when a preset condition is satisfied, instruct a user equipment to send an uplink channel by using one of the at least two maximum transmitted power values.

In an embodiment, the preset condition includes at least one of the following: the number N of repeated transmissions of the uplink channel is greater than or equal to a threshold Nth; the level index i of the user equipment is greater than or equal to an index threshold A; or the sending repetition level j of the uplink channel is greater than or equal to a repetition level threshold B.

In an embodiment, the configuration module is configured to configure the at least two maximum transmitted power values in the following manner: the configuration module configures a first maximum transmitted power value and a second maximum transmitted power value.

The power control module is configured to, when the preset condition is satisfied, the user equipment sends the uplink channel by using the second maximum transmitted power value.

The first maximum transmitted power value is configured uniformly.

The second maximum transmitted power value satisfies at least one of the following: configuration is performed for the user equipment at each level separately or configuration is performed for each user equipment separately.

In an embodiment, the second maximum transmitted power value is greater than or equal to the first maximum transmitted power value.

In an embodiment, the uplink channel includes at least one of the following channels: an uplink data channel, a random access channel or a scheduling request channel.

The power control method of embodiment one is explained using the examples below.

Example One

In one wireless communication system, three coverage enhancement levels CE level 0, CE level 1, and CE level 2 are supported.

A user equipment measures Reference Signal Received Power (RSRP). The user equipment estimates a path loss (PL) through the RSRP or estimates a coupling loss (CL) through the RSRP. The user equipment selects an appropriate power control scheme according to the range where the RSRP, PL or CL is located.

Figure 5A:
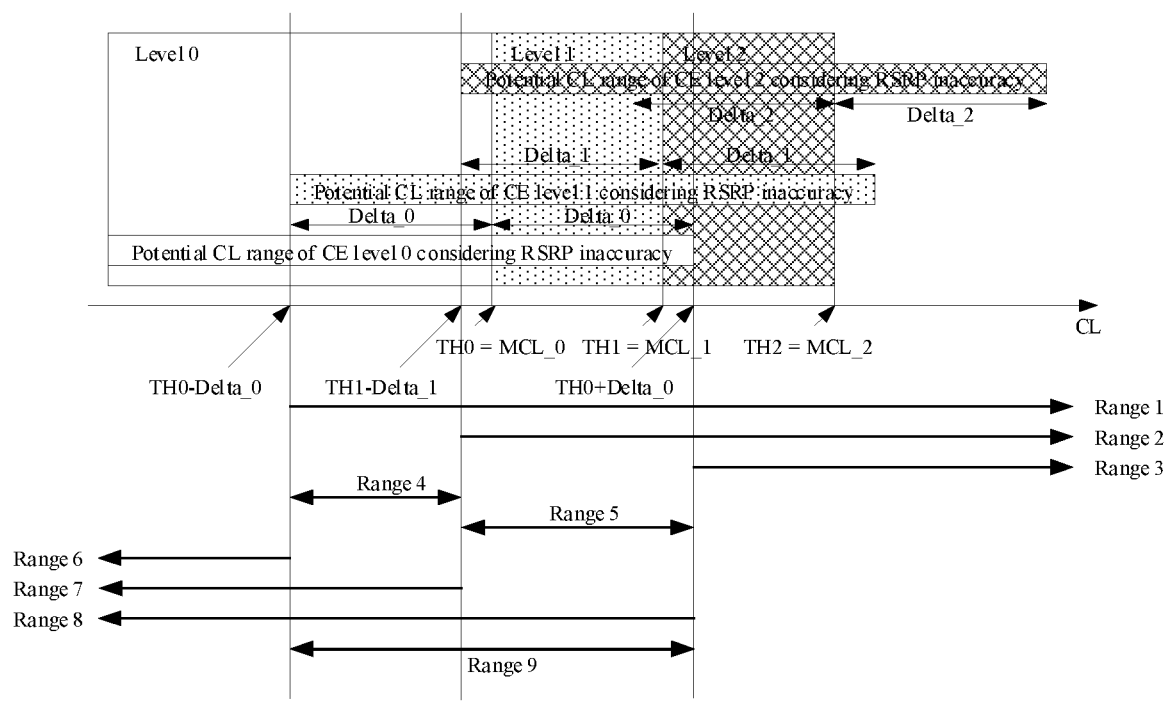
FIG. 5A is a schematic diagram of coverage enhancement level regions when CL is used as a metric value in example one of the present application.

As shown in FIG. 5A, the user equipment acquires the CL through RSRP measurement and through estimation and uses the CL as the metric value. TH0, TH1 and TH2 correspond to MCL_0, MCL_1 and MCL_2 respectively. MCL_i denotes the CL threshold corresponding to coverage enhancement level i, where i=0, 1 and 2.

The metric value X corresponding to CE level 0 satisfies X≤TH0.

The metric value X corresponding to CE level 1 satisfies TH0<X≤TH1.

The metric value X corresponding to CE level 2 satisfies TH1<X≤TH2.

Figure 5B:
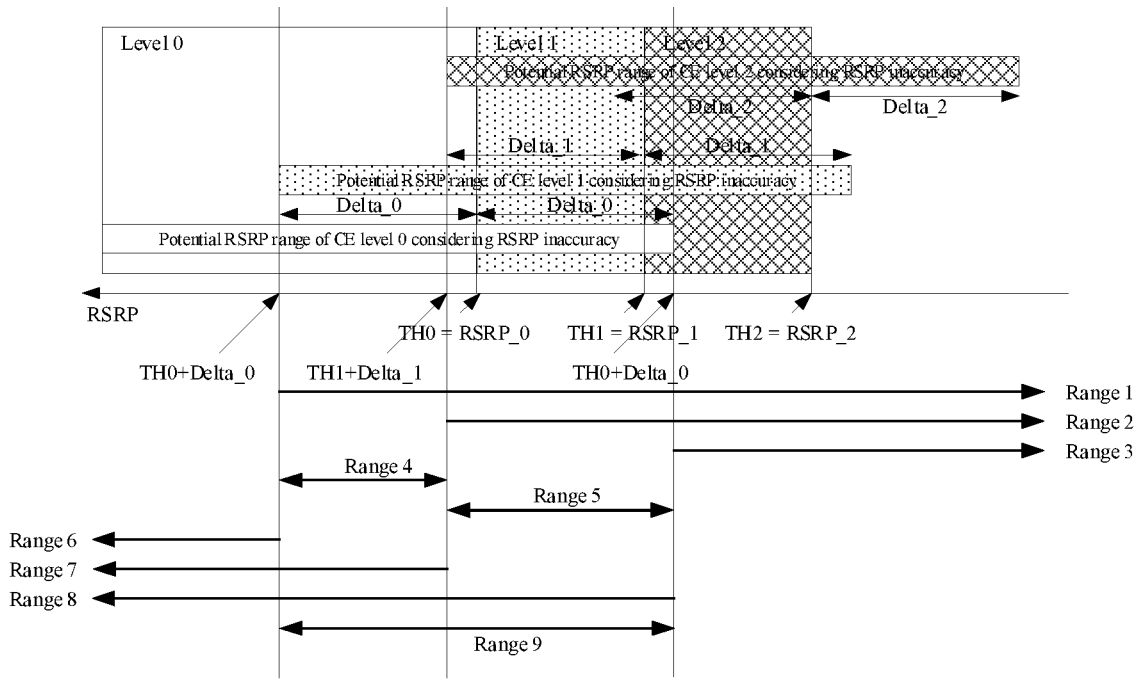
FIG. 5B is a schematic diagram of coverage enhancement level regions when RSRP is used as a metric value in example one of the present application.

As shown in FIG. 5B, the user equipment measures the RSRP and uses the RSRP as the metric value X. TH0, TH1 and TH2 correspond to RSRP_0, RSRP_1 and RSRP_2 respectively. RSRP_i denotes the RSRP threshold corresponding to coverage enhancement level i, where i=0, 1 and 2.

The metric value X corresponding to CE level 0 satisfies X≥TH0.

The metric value X corresponding to CE level 1 satisfies TH1≤X<TH0.

The metric value X corresponding to CE level 2 satisfies TH2≤X<TH1.

Figure 5C:
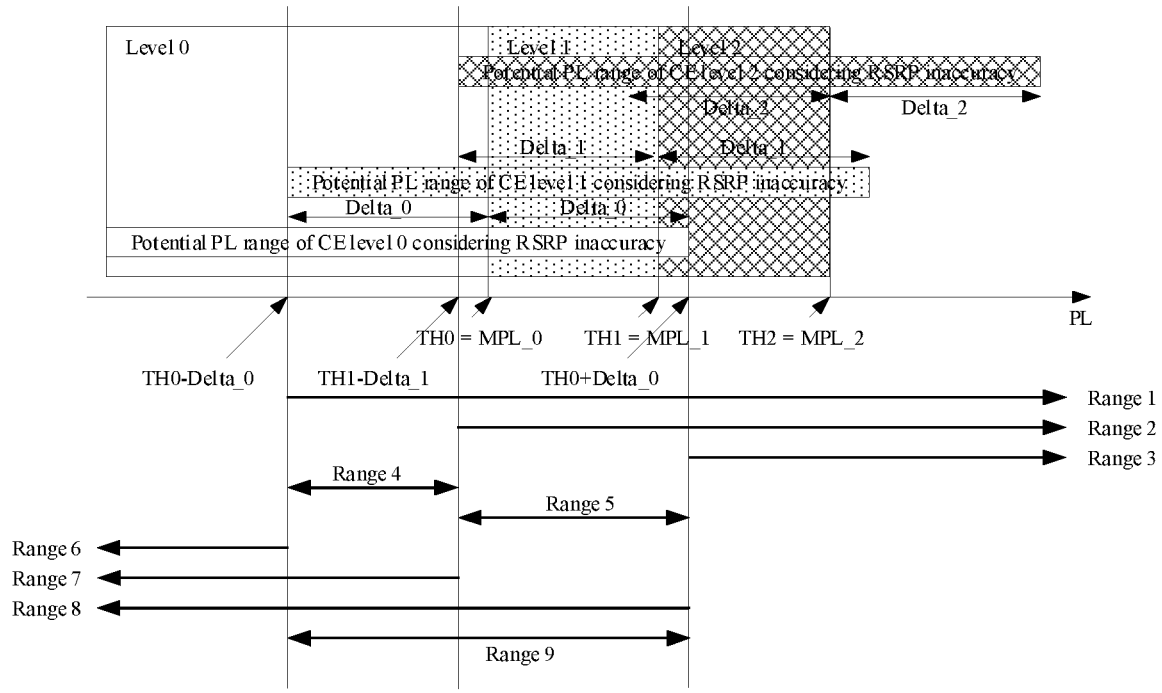
FIG. 5C is a schematic diagram of coverage enhancement level regions when PL is used as a metric value in example one of the present application.

As shown in FIG. 5C, the user equipment acquires the PL through RSRP measurement and through estimation and uses the PL as the metric value X. TH0, TH1 and TH2 correspond to MPL_0, MCL_1 and MPL_2 respectively. MPL_i denotes the PL threshold corresponding to coverage enhancement level i, where i=0, 1 and 2.

The metric value X corresponding to CE level 0 satisfies X≤TH0.

The metric value X corresponding to CE level 1 satisfies TH0<X≤TH1.

The metric value X corresponding to CE level 2 satisfies TH1<X≤TH2.

$$TH2-TH1=TH1-TH0=Delta\_TH.$$

$$Delta\_i > Delta\_TH,\ i=0,1,2.$$

Delta_i is an offset corresponding to enhancement level i. Different metric values X may correspond to the same or different Delta_i.

The power control mode includes at least one of the following: mode one: transmitted power of the preamble of the Physical Random Access Channel at level k is determined according to a path loss between the user equipment and a base station, maximum transmitted power, and target received power of the preamble of the Physical Random Access Channel at level k; mode two: the transmitted power of the preamble of the Physical Random Access Channel at level k is the maximum transmitted power of the user equipment; or mode three: the transmitted power of the preamble of the Physical Random Access Channel at level k is the maximum transmitted power of a user equipment corresponding to level k.

(I) The user equipment belongs to range 1.

It is determined that the user equipment belongs to range 1 when the user equipment satisfies at least one of the following conditions: CL satisfies CL≥MCL_0−Delta_0, RSRP satisfies RSRP≤RSRP_0+Delta_0 or PL satisfies PL≥MPL_0−Delta_0.

When the user equipment belongs to range 1, the power control strategy of the user equipment includes at least one of the strategies described below.

(1) The preamble is allowed to be sent on PRACH resources at CE levels 0, 1 and 2.

(2) The preamble can be sent on the PRACH resource at CE level 0 by using the power control mode of mode one. The preamble can be sent on the PRACH resource at CE level 1 and the PRACH resource at CE level 2 by using the power control mode of mode one, mode two or mode three (for example, the power control mode of mode two or mode three is selected).

In an embodiment, during $N_i$ ($N_i$ is greater than or equal to 1) attempts to send the preamble on the PRACH resource at CE level i (i=0, 1 and 2), the power control mode of mode one is used for Y1 (Y1 is greater than or equal to 0 and less than or equal to Ni) times and the power control mode of mode two or mode three is used for Y2 (Y2 is greater than or equal to 0 and less than or equal to Ni) times.

In an embodiment, the maximum transmitted power of the user equipment at each CE level is configured separately.

In an embodiment, when the UE attempts to send the preamble for $N_i$ ($N_i$ is greater than or equal to 1) times on the PRACH resource corresponding to CE level i (i=0) and fails to access the system according to a predetermined random access process, the UE needs to send the preamble on the PRACH resource corresponding to CE level (i+1).

When the UE attempts to send the preamble for Ni ($N_i$ is greater than or equal to 1) times on the PRACH resource corresponding to CE level i (i=1) and fails to access the system according to a predetermined random access process, the UE needs to send the preamble on the PRACH resource corresponding to CE level (i+1).

(II) The user equipment belongs to range 2.

It is determined that the user equipment belongs to range 2 when the user equipment satisfies at least one of the following conditions: CL satisfies CL≥MCL_1−Delta_1, RSRP satisfies RSRP≤RSRP_1+Delta_1 or PL satisfies PL≥MPL_1−Delta_1.

When the user equipment belongs to range 2, the power control strategy of the user equipment includes at least one of the strategies described below.

(1) The preamble is allowed to be sent on PRACH resources at CE levels 0, 1 and 2.

(2) The preamble can be sent on the PRACH resource at CE level i by using the power control mode of one of mode one, mode two or mode three or the power control mode of mode one, mode two or mode three in any combination, where i=0, 1 and 2.

In an embodiment, the preamble is sent on the PRACH resource at each CE level by using the power control mode of mode two or mode three.

In an embodiment, during $N_i$ ($N_i$ is greater than or equal to 1) attempts to send the preamble on the PRACH resource at CE level i (i=0, 1 and 2), the power control mode of mode one is used for Y1 (Y1 is greater than or equal to 0 and less than or equal to Ni) times and the power control mode of mode two or mode three is used for Y2 (Y2 is greater than or equal to 0 and less than or equal to Ni) times.

In an embodiment, when the UE attempts to send the preamble for $N_i$ ($N_i$ is greater than or equal to 1) times on the PRACH resource corresponding to CE level i (i=0) and fails to access the system according to a predetermined random access process, the UE needs to send the preamble on the PRACH resource corresponding to CE level (i+1).

When the UE attempts to send the preamble for Ni ($N_i$ is greater than or equal to 1) times on the PRACH resource corresponding to CE level i (i=1) and fails to access the system according to a predetermined random access process, the UE needs to send the preamble on the PRACH resource corresponding to CE level (i+1).

In an embodiment, the maximum transmitted power of the user equipment at each CE level is configured separately.

(III) The user equipment belongs to range 3.

It is determined that the user equipment belongs to range 3 when the user equipment satisfies at least one of the following conditions: CL satisfies CL≥MCL_0+Delta_0, RSRP satisfies RSRP≤RSRP_0−Delta_0 or PL satisfies PL≥MPL_0+Delta_0.

When the user equipment belongs to range 3, the power control strategy of the user equipment includes at least one of the strategies described below.

(1) The preamble is allowed to be sent on PRACH resources at CE levels 1 and 2. The preamble is prohibited from being sent on the PRACH resource at CE level 0.

(2) The preamble can be sent on PRACH resources at CE levels 1 and 2 by using the power control mode of mode two or mode three.

In an embodiment, when the UE attempts to send the preamble for $N_i$ ($N_i$ is greater than or equal to 1) times on the PRACH resource corresponding to CE level i (i=1) and fails to access the system according to a predetermined random access process, the UE needs to send the preamble on the PRACH resource corresponding to CE level (i+1).

In an embodiment, the maximum transmitted power of the user equipment at each CE level is configured separately.

(IV) The user equipment belongs to range 4.

It is determined that the user equipment belongs to range 4 when the user equipment satisfies at least one of the following conditions: CL satisfies MCL_0−Delta_0≤CL≤MCL_1−Delta_1, RSRP satisfies RSRP_1+Delta_1≤RSRP≤RSRP_0+Delta_0 or PL satisfies MPL_0−Delta_0≤PL≤MPL_1−Delta_1.

When the user equipment belongs to range 4, the power control strategy of the user equipment includes at least one of the strategies described below.

(1) The preamble is allowed to be sent on PRACH resources at CE levels 0 and 1.

(2) The preamble can be sent on the PRACH resource at CE level i by using the power control mode of one of mode one, mode two or mode three or the power control mode of mode one, mode two or mode three in any combination, where i=0 and 1.

In an embodiment, the preamble is sent on PRACH resources at CE levels 0 and 1 by using the power control mode of mode two or mode three.

In an embodiment, the preamble is allowed to be sent on the PRACH resource at CE level 2.

In an embodiment, during $N_i$ (Ni is greater than or equal to 1) attempts to send the preamble on the PRACH resource at CE level i (i=0 and 1), the power control mode of mode one is used for Y1 (Y1 is greater than or equal to 0 and less than or equal to Ni) times and the power control mode of mode two or mode three is used for Y2 (Y2 is greater than or equal to 0 and less than or equal to Ni) times.

In an embodiment, when the UE attempts to send the preamble for $N_i$ ($N_i$ is greater than or equal to 1) times on the PRACH resource corresponding to CE level i (i=0) and fails to access the system according to a predetermined random access process, the UE needs to send the preamble on the PRACH resource corresponding to CE level (i+1).

When the UE attempts to send the preamble for Ni ($N_i$ is greater than or equal to 1) times on the PRACH resource corresponding to CE level i (i=1) and fails to access the system according to a predetermined random access process, the UE needs to send the preamble on the PRACH resource corresponding to CE level (i+1).

In an embodiment, the maximum transmitted power of the user equipment at each CE level is configured separately.

(I) The user equipment belongs to range 5.

It is determined that the user equipment belongs to range 5 when the user equipment satisfies at least one of the following conditions: CL satisfies MCL_1−Delta_1≤CL≤MCL_0+Delta_0, RSRP satisfies RSRP_0−Delta_0≤RSRP≤RSRP_1+Delta_1 or PL satisfies MPL_1−Delta_1≤PL≤MPL_0+Delta_0.

When the user equipment belongs to range 5, the power control strategy of the user equipment includes at least one of the strategies described below.

(1) The preamble is allowed to be sent on PRACH resources at CE levels 0, 1 and 2.

(2) The preamble can be sent on the PRACH resource at CE level i by using the power control mode of one of mode one, mode two or mode three or the power control mode of mode one, mode two or mode three in any combination, where i=0, 1 and 2.

In an embodiment, during $N_i$ (Ni is greater than or equal to 1) attempts to send the preamble on the PRACH resource at CE level i (i=0, 1 and 2), the power control mode of mode one is used for Y1 (Y1 is greater than or equal to 0 and less than or equal to Ni) times and the power control mode of mode two or mode three is used for Y2 (Y2 is greater than or equal to 0 and less than or equal to Ni) times.

In an embodiment, the preamble is sent on PRACH resources at CE levels 0, 1 and 2 by using the power control mode of mode two or mode three.

In an embodiment, the maximum transmitted power of the user equipment at each CE level is configured separately.

In an embodiment, when the UE attempts to send the preamble for $N_i$ ($N_i$ is greater than or equal to 1) times on the PRACH resource corresponding to CE level i (i=0) and fails to access the system according to a predetermined random access process, the UE needs to send the preamble on the PRACH resource corresponding to CE level (i+1).

When the UE attempts to send the preamble for Ni ($N_i$ is greater than or equal to 1) times on the PRACH resource corresponding to CE level i (i=1) and fails to access the system according to a predetermined random access process, the UE needs to send the preamble on the PRACH resource corresponding to CE level (i+1).

(VI) The user equipment belongs to range 6.

It is determined that the user equipment belongs to range 6 when the user equipment satisfies at least one of the following conditions: CL satisfies CL≤MCL_0−Delta_0, RSRP satisfies RSRP≥RSRP_0+Delta_0 or PL satisfies PL≤MPL_0−Delta_0.

When the user equipment belongs to range 6, the power control strategy of the user equipment includes at least one of the strategies described below.

(1) The preamble is allowed to be sent on the PRACH resource at CE level 0. The preamble is prohibited from being sent on PRACH resources at CE levels 1 and 2.

(2) The preamble can be sent on the PRACH resource at CE level 0 by using the power control mode of one of mode one, mode two or mode three or the power control mode of mode one, mode two or mode three in any combination.

In an embodiment, during $N_0$ ($N_0$ is greater than or equal to 1) attempts to send the preamble on the PRACH resource at CE level 0, the power control mode of mode one is used for Y1 (Y1 is greater than or equal to 0 and less than or equal to $N_0$) times and the power control mode of mode two or mode three is used for Y2 (Y2 is greater than or equal to 0 and less than or equal to $N_0$) times.

(VII) The user equipment belongs to range 7.

It is determined that the user equipment belongs to range 7 when the user equipment satisfies at least one of the following conditions: CL satisfies CL≤MCL_1−Delta_1, RSRP satisfies RSRP≥RSRP_1+Delta_1 or PL satisfies PL≤MPL_1−Delta_1.

When the user equipment belongs to range 7, the power control strategy of the user equipment includes at least one of the strategies described below.

(1) The preamble is allowed to be sent on PRACH resources at CE levels 0 and 1. The preamble is prohibited from being sent on the PRACH resource at CE level 2.

(2) The preamble can be sent on the PRACH resource at CE level i by using the power control mode of one of mode one, mode two or mode three or the power control mode of mode one, mode two or mode three in any combination, where i=0 and 1.

In an embodiment, the preamble is sent on PRACH resources at CE levels 0 and 1 by using the power control mode of mode one.

In an embodiment, during $N_i$ (Ni is greater than or equal to 1) attempts to send the preamble on the PRACH resource at CE level i (i=0 and 1), the power control mode of mode one is used for Y1 (Y1 is greater than or equal to 0 and less than or equal to Ni) times and the power control mode of mode two or mode three is used for Y2 (Y2 is greater than or equal to 0 and less than or equal to Ni) times.

In an embodiment, the maximum transmitted power of the user equipment at each CE level is configured separately.

(VIII) The user equipment belongs to range 8.

It is determined that the user equipment belongs to range 8 when the user equipment satisfies at least one of the following conditions: CL satisfies CL≤MCL_0+Delta_0, RSRP satisfies RSRP≥RSRP_0−Delta_0 or PL satisfies PL≤MPL_0+Delta_0.

When the user equipment belongs to range 8, the power control strategy of the user equipment includes at least one of the strategies described below.

(1) The preamble is allowed to be sent on PRACH resources at CE levels 0, 1 and 2.

(2) The preamble can be sent on the PRACH resource at CE level i by using the power control mode of one of mode one, mode two or mode three or the power control mode of mode one, mode two or mode three in any combination, where i=0, 1 and 2.

In an embodiment, during $N_i$ (Ni is greater than or equal to 1) attempts to send the preamble on the PRACH resource at CE level i (i=0, 1 and 2), the power control mode of mode one is used for Y1 (Y1 is greater than or equal to 0 and less than or equal to Ni) times and the power control mode of mode two or mode three is used for Y2 (Y2 is greater than or equal to 0 and less than or equal to Ni) times.

In an embodiment, the preamble is sent on the PRACH resource at CE level 0 by using the power control mode of mode one and the preamble is sent on the PRACH resource at CE level 1 and the PRACH resource at CE level 2 by using the power control mode of mode two or mode three.

In an embodiment, the maximum transmitted power of the user equipment at each CE level is configured separately.

(IX) The user equipment belongs to range 9.

It is determined that the user equipment belongs to range 9 when the user equipment satisfies at least one of the following conditions: CL satisfies MCL_0−Delta_0≤CL≤MCL_0+Delta_0, RSRP satisfies RSRP_0−Delta_0≤RSRP≤RSRP_0+Delta_0 or PL satisfies MPL_0−Delta_0≤PL≤MPL_0+Delta_0.

When the user equipment belongs to range 9, the power control strategy of the user equipment includes at least one of the strategies described below.

(1) The preamble is allowed to be sent on PRACH resources at CE levels 0, 1 and 2.

(2) The preamble is sent on the PRACH resource at CE level i by using the power control mode of one of mode one, mode two or mode three or the power control mode of mode one, mode two or mode three in any combination, where i=0, 1 and 2.

In an embodiment, during $N_i$ (Ni is greater than or equal to 1) attempts to send the preamble on the PRACH resource at CE level i (i=0, 1 and 2), the power control mode of mode one is used for Y1 (Y1 is greater than or equal to 0 and less than or equal to Ni) times and the power control mode of mode two or mode three is used for Y2 (Y2 is greater than or equal to 0 and less than or equal to Ni) times.

In an embodiment, the preamble is sent on PRACH resources at CE levels 0, 1 and 2 by using the power control mode of mode two or mode three.

In an embodiment, the maximum transmitted power of the user equipment at each CE level is configured separately.

Example Two

In one wireless communication system, three coverage enhancement levels CE level 0, CE level 1, and CE level 2 are supported.

A user equipment measures Reference Signal Received Power (RSRP). The user equipment estimates a path loss (PL) through the RSRP or estimates a coupling loss (CL) through the RSRP. The user equipment selects an appropriate power control scheme according to the range where the RSRP, PL or CL is located.

Figure 6A:
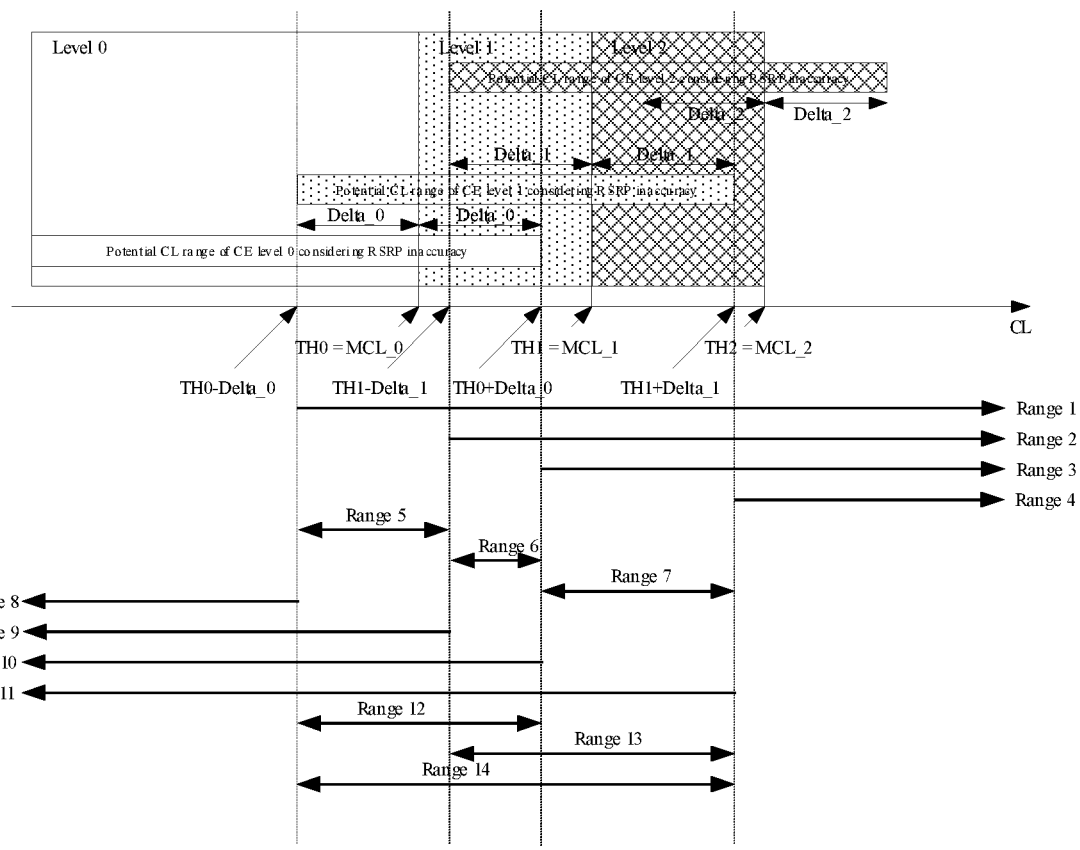
FIG. 6A is a schematic diagram of coverage enhancement level regions when CL is used as a metric value in example one of the present application.

As shown in FIG. 6A, the user equipment acquires the CL through RSRP measurement and through estimation and uses the CL as the metric value. TH0, TH1 and TH2 correspond to MCL_0, MCL_1 and MCL_2 respectively. MCL_i denotes the CL threshold corresponding to coverage enhancement level i, where i=0, 1 and 2.

The metric value X corresponding to CE level 0 satisfies X≤TH0.

The metric value X corresponding to CE level 1 satisfies TH0<X≤TH1.

The metric value X corresponding to CE level 2 satisfies TH1<X≤TH2.

Figure 6B:
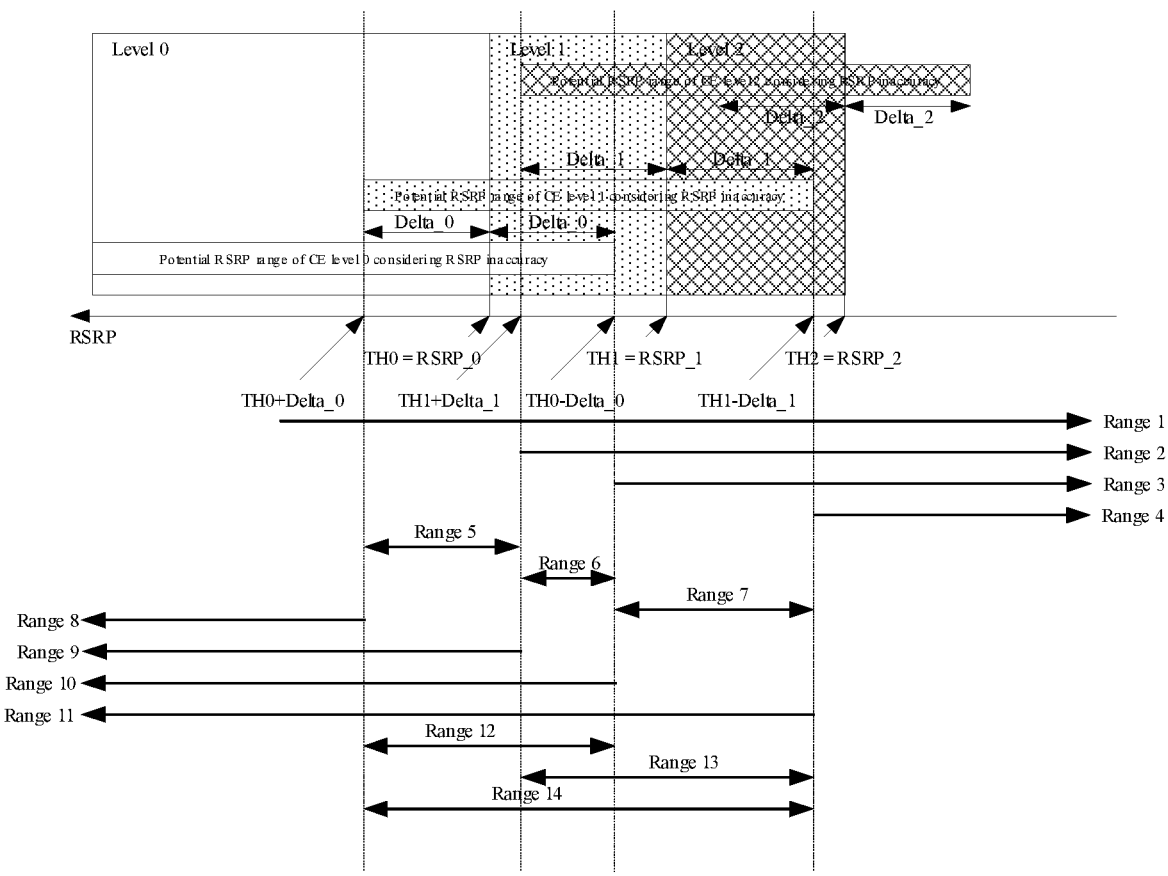
FIG. 6B is a schematic diagram of coverage enhancement level regions when RSRP is used as a metric value in example one of the present application.

As shown in FIG. 6B, the user equipment measures the RSRP and uses the RSRP as the metric value X. TH0, TH1 and TH2 correspond to RSRP_0, RSRP_1 and RSRP_2 respectively. RSRP_i denotes the RSRP threshold corresponding to coverage enhancement level i, where i=0, 1 and 2.

The metric value X corresponding to CE level 0 satisfies X≥TH0.

The metric value X corresponding to CE level 1 satisfies TH1≤X<TH0.

The metric value X corresponding to CE level 2 satisfies TH2≤X<TH1.

Figure 6C:
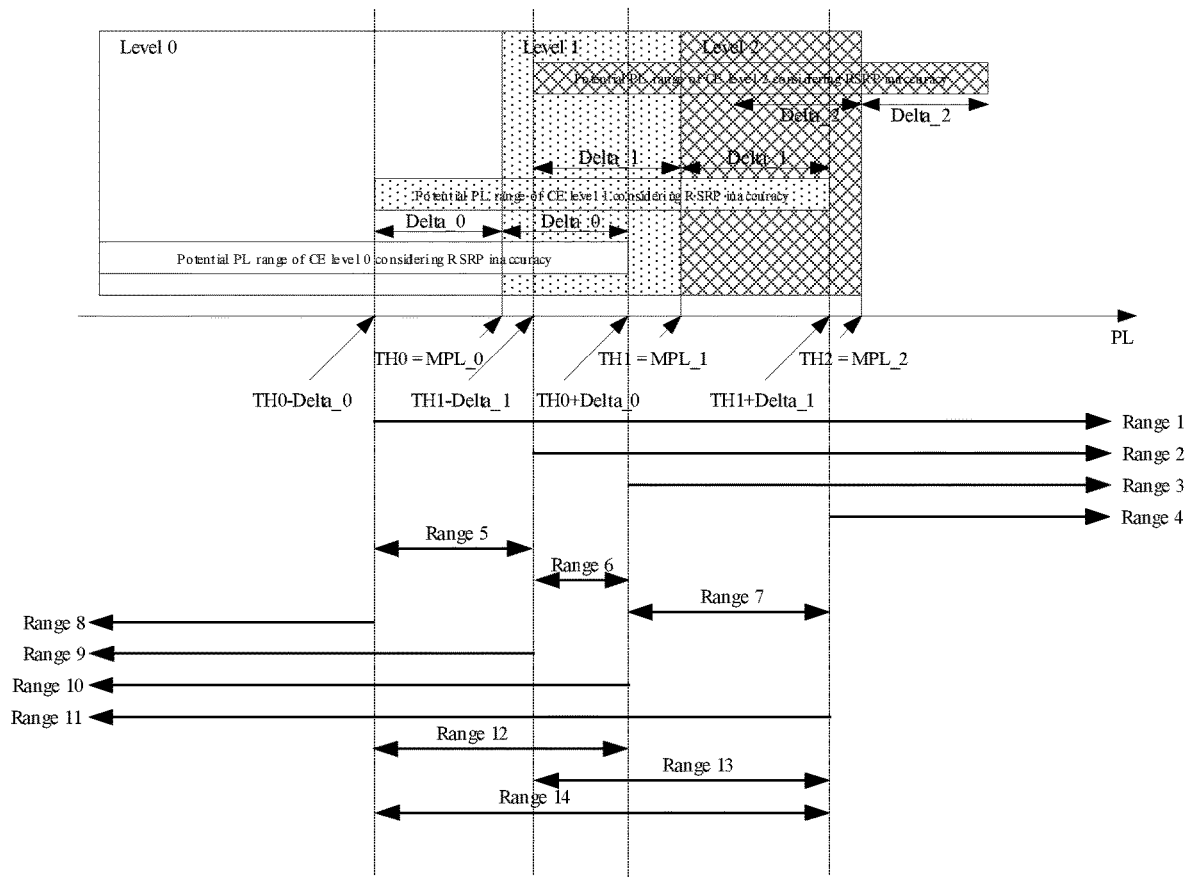
FIG. 6C is a schematic diagram of coverage enhancement level regions when PL is used as a metric value in example one of the present application.

As shown in FIG. 6C, the user equipment acquires the PL through RSRP measurement and through estimation and uses the PL as the metric value X. TH0, TH1 and TH2 correspond to MPL_0, MCL_1 and MPL_2 respectively. MPL_i denotes the PL threshold corresponding to coverage enhancement level i, where i=0, 1 and 2.

The metric value X corresponding to CE level 0 satisfies X<TH0.

The metric value X corresponding to CE level 1 satisfies TH0<X≤TH1.

The metric value X corresponding to CE level 2 satisfies TH1<X≤TH2.

$$TH2-TH1=TH1-TH0=\text{Delta\_TH}.$$

$$\text{Delta\_i} \le \text{Delta\_TH}, i=0,1,2.$$

Delta_i is an offset corresponding to enhancement level i.

Different metric values X may correspond to the same or different Delta_i.

The power control mode includes at least one of the following: mode one: transmitted power of the preamble of the Physical Random Access Channel at level k is determined according to a path loss between the user equipment and a base station, the maximum transmitted power of the user equipment, and target received power of the preamble of the Physical Random Access Channel at level k; mode two: the transmitted power of the preamble of the Physical Random Access Channel at level k is the maximum transmitted power of the user equipment; or mode three: the transmitted power of the preamble of the Physical Random Access Channel at level k is the maximum transmitted power of a user equipment corresponding to level k.

(I) The user equipment belongs to range 1.

It is determined that the user equipment belongs to range 1 when the user equipment satisfies at least one of the following conditions: CL satisfies CL≥MCL_0−Delta_0, RSRP satisfies RSRP≤RSRP_0+Delta_0 or PL satisfies PL≥MPL_0−Delta_0.

When the user equipment belongs to range 1, the power control strategy of the user equipment includes at least one of the strategies described below.

(1) The preamble is allowed to be sent on PRACH resources at CE levels 0, 1 and 2.

(2) The preamble can be sent on the PRACH resource at CE level 0 by using the power control mode of mode one.

(3) The preamble can be sent on the PRACH resource at CE level i by using the power control mode of one of mode one, mode two or mode three or the power control mode of mode one, mode two or mode three in any combination, where i=1 and 2.

In an embodiment, during $N_i$ (Ni is greater than or equal to 1) attempts to send the preamble on the PRACH resource at CE level i (i=1 and 2), the power control mode of mode one is used for Y1 (Y1 is greater than or equal to 0 and less than or equal to Ni) times and the power control mode of mode two or mode three is used for Y2 (Y2 is greater than or equal to 0 and less than or equal to Ni) times.

In an embodiment, when the UE attempts to send the preamble for $N_i$ ($N_i$ is greater than or equal to 1) times on the PRACH resource corresponding to CE level i (i=0) and fails to access the system according to a predetermined random access process, the UE needs to send the preamble on the PRACH resource corresponding to CE level (i+1).

When the UE attempts to send the preamble for Ni ($N_i$ is greater than or equal to 1) times on the PRACH resource corresponding to CE level i (i=1) and fails to access the system according to a predetermined random access process, the UE needs to send the preamble on the PRACH resource corresponding to CE level (i+1).

In an embodiment, the preamble is sent on PRACH resources at CE levels 1 and 2 by using the power control mode of mode two or mode three.

In an embodiment, the maximum transmitted power of the user equipment at each CE level is configured separately.

(II) The user equipment belongs to range 2.

It is determined that the user equipment belongs to range 2 when the user equipment satisfies at least one of the following conditions: CL satisfies CL≥MCL_1−Delta_1, RSRP satisfies RSRP≤RSRP_1+Delta_1 or PL satisfies PL≥MPL_1−Delta_1.

When the user equipment belongs to range 2, the power control strategy of the user equipment includes at least one of the strategies described below.

(1) The preamble is allowed to be sent on PRACH resources at CE levels 0, 1 and 2.

(2) The preamble can be sent on the PRACH resource at CE level i by using the power control mode of one of mode one, mode two or mode three or the power control mode of mode one, mode two or mode three in any combination, where i=0, 1 and 2.

In an embodiment, during $N_i$ (Ni is greater than or equal to 1) attempts to send the preamble on the PRACH resource at CE level i (i=0, 1 and 2), the power control mode of mode one is used for Y1 (Y1 is greater than or equal to 0 and less than or equal to Ni) times and the power control mode of mode two or mode three is used for Y2 (Y2 is greater than or equal to 0 and less than or equal to Ni) times.

In an embodiment, the preamble is sent on PRACH resources at CE levels 0, 1 and 2 by using the power control mode of mode two or mode three.

In an embodiment, when the UE attempts to send the preamble for $N_i$ ($N_i$ is greater than or equal to 1) times on the PRACH resource corresponding to CE level i (i=0) and fails to access the system according to a predetermined random access process, the UE needs to send the preamble on the PRACH resource corresponding to CE level (i+1).

When the UE attempts to send the preamble for Ni ($N_i$ is greater than or equal to 1) times on the PRACH resource corresponding to CE level i (i=1) and fails to access the system according to a predetermined random access process, the UE needs to send the preamble on the PRACH resource corresponding to CE level (i+1).

In an embodiment, the maximum transmitted power of the user equipment at each CE level is configured separately.

(III) The user equipment belongs to range 3.

It is determined that the user equipment belongs to range 3 when the user equipment satisfies at least one of the following conditions: CL satisfies $CL \geq MCL\_0+Delta\_0$ when X is CL, RSRP satisfies $RSRP \leq RSRP\_0-Delta\_0$ when X is RSRP, or PL satisfies $PL \geq MPL\_0+Delta\_0$ when X is PL.

When the user equipment belongs to range 3, the power control strategy of the user equipment includes at least one of the strategies described below.

(1) The preamble is allowed to be sent on PRACH resources at CE levels 1 and 2. The preamble is prohibited from being sent on the PRACH resource at CE level 0.

(2) The preamble can be sent on PRACH resources at CE levels 1 and 2 by using the power control mode of mode two or mode three.

In an embodiment, the maximum transmitted power of the user equipment at each CE level is configured separately.

In an embodiment, when the UE attempts to send the preamble for $N_i$ ($N_i$ is greater than or equal to 1) times on the PRACH resource corresponding to CE level i (i=1) and fails to access the system according to a predetermined random access process, the UE needs to send the preamble on the PRACH resource corresponding to CE level (i+1).

(IV) The user equipment X belongs to range 4.

It is determined that the user equipment belongs to range 4 when the user equipment satisfies at least one of the following conditions: CL satisfies $CL \geq MCL\_1+Delta\_1$, RSRP satisfies $RSRP \leq RSRP\_0-Delta\_0$ or PL satisfies $PL \geq MPL\_1+Delta\_1$.

When the user equipment belongs to range 4, the power control strategy of the user equipment includes at least one of the strategies described below.

(1) The preamble is allowed to be sent on the PRACH resource at CE level 2. The preamble is prohibited from being sent on PRACH resources at CE levels 0 and 1.

(2) The preamble is sent on the PRACH resource at CE level 2 by using the power control mode of mode two or mode three.

(V) The user equipment belongs to range 5.

It is determined that the user equipment belongs to range 5 when the user equipment satisfies at least one of the following conditions: CL satisfies $MCL\_0-Delta\_0 \leq CL \leq MCL\_1-Delta\_1$, RSRP satisfies $RSRP\_1+Delta\_1 \leq RSRP \leq RSRP\_0+Delta\_0$ or PL satisfies $MPL\_0-Delta\_0 \leq PL \leq MPL\_1-Delta\_1$.

When the user equipment belongs to range 5, the power control strategy of the user equipment includes at least one of the strategies described below.

(1) The preamble is allowed to be sent on PRACH resources at CE levels 0 and 1.

(2) The preamble is sent on PRACH resources at CE levels 0 and 1 by using the power control mode of mode two or mode three.

In an embodiment, the preamble is allowed to be sent on the PRACH resource at CE level 2.

In an embodiment, when the UE attempts to send the preamble for $N_i$ ($N_i$ is greater than or equal to 1) times on the PRACH resource corresponding to CE level i (i=0) and fails to access the system according to a predetermined random access process, the UE needs to send the preamble on the PRACH resource corresponding to CE level (i+1).

In an embodiment, the maximum transmitted power of the user equipment at each CE level is configured separately.

(VI) The user equipment belongs to range 6.

It is determined that the user equipment belongs to range 6 when the user equipment satisfies at least one of the following conditions: CL satisfies $MCL\_1-Delta\_1 \leq CL \leq MCL\_0+Delta\_0$, RSRP satisfies $RSRP\_0-Delta\_0 \_RSRP \leq RSRP\_1+Delta\_1$ or PL satisfies $MPL\_1-Delta\_1 \leq PL \leq MPL\_0+Delta\_0$.

When the user equipment belongs to range 6, the power control strategy of the user equipment includes at least one of the strategies described below.

(1) The preamble is allowed to be sent on PRACH resources at CE levels 1 and 2.

(2) The preamble is sent on PRACH resources at CE levels 1 and 2 by using the power control mode of mode two or mode three.

In an embodiment, the preamble is allowed to be sent on the PRACH resource at CE level 0.

In an embodiment, when the UE attempts to send the preamble for $N_i$ ($N_i$ is greater than or equal to 1) times on the PRACH resource corresponding to CE level i (i=1) and fails to access the system according to a predetermined random access process, the UE needs to send the preamble on the PRACH resource corresponding to CE level (i+1).

In an embodiment, the maximum transmitted power of the user equipment at each CE level is configured separately.

(VII) The user equipment belongs to range 7.

It is determined that the user equipment belongs to range 7 when the user equipment satisfies at least one of the following conditions: CL satisfies $MCL\_0+Delta\_0 \leq CL \leq MCL\_1+Delta\_1$, RSRP satisfies $RSRP\_1-Delta\_1 \leq RSRP \leq RSRP\_0-Delta\_0$ or PL satisfies $MPL\_0+Delta\_0 \leq PL \leq MPL\_1+Delta\_1$.

When the user equipment belongs to range 7, the power control strategy of the user equipment includes at least one of the strategies described below.

(1) The preamble is allowed to be sent on PRACH resources at CE levels 1 and 2.

(2) The preamble is sent on PRACH resources at CE levels 1 and 2 by using the power control mode of mode two or mode three.

In an embodiment, the preamble is allowed to be sent on the PRACH resource at CE level 0.

In an embodiment, when the UE attempts to send the preamble for $N_i$ ($N_i$ is greater than or equal to 1) times on the PRACH resource corresponding to CE level i (i=1) and fails to access the system according to a predetermined random access process, the UE needs to send the preamble on the PRACH resource corresponding to CE level (i+1).

In an embodiment, the maximum transmitted power of the user equipment at each CE level is configured separately.

(VIII) The user equipment belongs to range 8.

It is determined that the user equipment belongs to range 8 when the user equipment satisfies at least one of the following conditions: CL satisfies $CL \leq MCL\_0-Delta\_0$, RSRP satisfies $RSRP \geq RSRP\_0+Delta\_0$ or PL satisfies $PL \leq MPL\_0-Delta\_0$.

When the user equipment belongs to range 8, the power control strategy of the user equipment includes at least one of the strategies described below.

(1) The preamble is allowed to be sent on the PRACH resource at CE level 0. The preamble is prohibited from being sent on PRACH resources at CE levels 1 and 2.

(2) The preamble is sent on the PRACH resource at CE level 0 by using the power control mode of mode one.

In an embodiment, the preamble is sent on the PRACH resource at CE level 0 by using the power control mode of one of mode one, mode two or mode three or the power control mode of mode one, mode two or mode three in any combination.

In an embodiment, during $N_i$ (Ni is greater than or equal to 1) attempts to send the preamble on the PRACH resource at CE level i (i=0), the power control mode of mode one is used for Y1 (Y1 is greater than or equal to 0 and less than or equal to Ni) times and the power control mode of mode two or mode three is used for Y2 (Y2 is greater than or equal to 0 and less than or equal to Ni) times.

(IX) The user equipment belongs to range 9.

It is determined that the user equipment belongs to range 9 when the user equipment satisfies at least one of the following conditions: CL satisfies CL≤MCL_1−Delta_1, RSRP satisfies RSRP≥RSRP_1+Delta_1 or PL satisfies PL≤MPL_1−Delta_1.

When the user equipment belongs to range 9, the power control strategy of the user equipment includes at least one of the strategies described below.

(1) The preamble is allowed to be sent on PRACH resources at CE levels 0 and 1. The preamble is prohibited from being sent on the PRACH resource at CE level 2.

(2) The preamble is sent on the PRACH resource at CE level i by using the power control mode of one of mode one, mode two or mode three or the power control mode of mode one, mode two or mode three in any combination, where i=0, and 1.

In an embodiment, during $N_i$ (Ni is greater than or equal to 1) attempts to send the preamble on the PRACH resource at CE level i (i=0 and 1), the power control mode of mode one is used for Y1 (Y1 is greater than or equal to 0 and less than or equal to Ni) times and the power control mode of mode two or mode three is used for Y2 (Y2 is greater than or equal to 0 and less than or equal to Ni) times.

In an embodiment, the preamble is sent on PRACH resources at CE levels 0 and 1 by using the power control mode of mode one.

In an embodiment, when the UE attempts to send the preamble for $N_i$ ($N_i$ is greater than or equal to 1) times on the PRACH resource corresponding to CE level i (i=0) and fails to access the system according to a predetermined random access process, the UE needs to send the preamble on the PRACH resource corresponding to CE level (i+1).

In an embodiment, the maximum transmitted power of the user equipment at each CE level is configured separately.

(X) The user equipment belongs to range 10, range 11, range 12, range 13 or range 14.

It is determined that the user equipment belongs to range 10 when the user equipment satisfies at least one of the following conditions: CL satisfies CL≤MCL_0+Delta_0, RSRP satisfies RSRP≥RSRP_0−Delta_0 or PL satisfies PL≤MPL_0+Delta_0.

It is determined that the user equipment belongs to range 11 when the user equipment satisfies at least one of the following conditions: CL satisfies CL≥MCL_1+Delta_1, RSRP satisfies RSRP≥RSRP_1−Delta_1 or PL satisfies PL≥MPL_1+Delta_1.

It is determined that the user equipment belongs to range 12 when the user equipment satisfies at least one of the following conditions: CL satisfies MCL_0−Delta_0≤CL≤MCL_0+Delta_0, RSRP satisfies RSRP_0−Delta_0_RSRP≤RSRP_0+Delta_0 or PL satisfies MPL_0−Delta_0≤PL≤MPL_0+Delta_0.

It is determined that the user equipment belongs to range 13 when the user equipment satisfies at least one of the following conditions: CL satisfies MCL_1−Delta_1≤CL≤MCL_1+Delta_1, RSRP satisfies RSRP_1−Delta_1≤RSRP≤RSRP_1+Delta_1 or PL satisfies MPL_1−Delta_1≤PL≤MPL_1+Delta_1.

It is determined that the user equipment belongs to range 14 when the user equipment satisfies at least one of the following conditions: CL satisfies MCL_0−Delta_0≤CL≤MCL_1+Delta_1, RSRP satisfies RSRP_1−Delta_1≤RSRP≤RSRP_0+Delta_0 or PL satisfies MPL_0−Delta_0≤PL≤MPL_1+Delta_1.

When the user equipment belongs to range 10, range 11, range 12, range 13 or range 14, the power control strategy of the user equipment includes at least one of the strategies described below.

(1) The preamble is allowed to be sent on PRACH resources at CE levels 0, 1 and 2.

(2) The preamble is sent on the PRACH resource at CE level i by using the power control mode of one of mode one, mode two or mode three or the power control mode of mode one, mode two or mode three in any combination, where i=0, 1 and 2.

In an embodiment, during $N_i$ (Ni is greater than or equal to 1) attempts to send the preamble on the PRACH resource at CE level i (i=0, 1 and 2), the power control mode of mode one is used for Y1 (Y1 is greater than or equal to 0 and less than or equal to Ni) times and the power control mode of mode two or mode three is used for Y2 (Y2 is greater than or equal to 0 and less than or equal to Ni) times.

In an embodiment, the preamble is sent on the PRACH resource at CE level 0 by using the power control mode of mode one and the preamble is sent on the PRACH resource at CE level 1 and the PRACH resource at CE level 2 by using the power control mode of mode two or mode three.

In an embodiment, when the UE attempts to send the preamble for $N_i$ ($N_i$ is greater than or equal to 1) times on the PRACH resource corresponding to CE level i (i=0) and fails to access the system according to a predetermined random access process, the UE needs to send the preamble on the PRACH resource corresponding to CE level (i+1).

When the UE attempts to send the preamble for Ni ($N_i$ is greater than or equal to 1) times on the PRACH resource corresponding to CE level i (i=1) and fails to access the system according to a predetermined random access process, the UE needs to send the preamble on the PRACH resource corresponding to CE level (i+1).

In an embodiment, the maximum transmitted power of the user equipment at each CE level is configured separately.

What is claimed is:

1. A power control method, comprising:
   sending, by a user equipment at level i, a preamble on a resource of a Physical Random Access Channel at level k according to a determined power control mode, wherein k is greater than or equal to i;
   wherein the power control mode comprises at least one of the following:
   mode one: transmitted power of the preamble of the Physical Random Access Channel at level k is determined according to a path loss between the user equipment and a base station, maximum transmitted power, and target received power of the preamble of the Physical Random Access Channel at level k;
   mode two: the transmitted power of the preamble of the Physical Random Access Channel at level k is the maximum transmitted power of the user equipment; or
   mode three: the transmitted power of the preamble of the Physical Random Access Channel at level k is maximum transmitted power of a user equipment corresponding to level k.

2. The method of claim 1, wherein sending, by the user equipment at level i, the preamble on the resource of the Physical Random Access Channel at level k according to the determined power control mode comprises:

attempting, by the user equipment at level i, to send the preamble on the resource of the Physical Random Access Channel at level k for $N_k$ times, wherein $N_k$ is greater than or equal to 1;
wherein $N_k$ denotes an upper limit of a number of times for which the preamble is sent on the Physical Random Access Channel at level k.

3. The method of claim 2, further comprising:
separately configuring a Physical Random Access Channel at each level with an upper limit of the number of times for which the preamble is sent.

4. The method of claim 2, wherein
during $N_k$ attempts to send the preamble, the power control mode of mode one is used for Y1 times and the power control mode of mode two or mode three is used for Y2 times, wherein Y1 is greater than or equal to 0 and Y2 is greater than or equal to 0,
wherein a difference of two levels is between level k and level i, wherein k=i+2.

5. The method of claim 1, wherein
sending, by the user equipment at level i, the preamble on the resource of the Physical Random Access Channel at level k according to the determined power control mode comprises performing at least one of the following processing modes:
when k=i, the user equipment at level i sends the preamble on the resource of the Physical Random Access Channel at level k by using the power control mode of mode one;
when k=i+1, the user equipment at level i sends the preamble on the resource of the Physical Random Access Channel at level k by using the power control mode of mode two; or
when k=i+2, the user equipment at level i sends the preamble on the resource of the Physical Random Access Channel at level k by using the power control mode of mode three,
or, sending, by the user equipment at level i, the preamble on the resource of the Physical Random Access Channel at level k according to the determined power control mode comprises performing at least one of the following processing modes:
when k=i, the user equipment at level i sends the preamble on the resource of the Physical Random Access Channel at level k by using the power control mode of mode one;
when k=i+1, the user equipment at level i sends the preamble on the resource of the Physical Random Access Channel at level k by using the power control mode of mode three; or
when k=i+2, the user equipment at level i sends the preamble on the resource of the Physical Random Access Channel at level k by using the power control mode of mode three.

6. The method of claim 1, wherein
Case 1: sending, by the user equipment at level i, the preamble on the resource of the Physical Random Access Channel at level k according to the determined power control mode comprises one of:
when the user equipment at level i satisfies at least one of a first type of condition, prohibiting the user equipment at level i from sending the preamble on a resource of a Physical Random Access Channel at level j, wherein j is greater than i; or allowing the user equipment at level i to send the preamble on a resource of a Physical Random Access Channel at level i,
or, when the user equipment at level i satisfies at least one of a first type of condition, performing at least one of the following processing modes:
the preamble is sent on the resource of the Physical Random Access Channel at level k by using the power control mode of mode one, wherein k=0;
the preamble is sent on the resource of the Physical Random Access Channel at level k by using the power control mode of mode two, wherein k=1; or
the preamble is sent on the resource of the Physical Random Access Channel at level k by using the power control mode of mode three, wherein k=2;
or, when the user equipment at level i satisfies at least one of a first type of condition, performing at least one of the following processing modes:
the preamble is sent on the resource of the Physical Random Access Channel at level k by using the power control mode of mode one, wherein k=0;
the preamble is sent on the resource of the Physical Random Access Channel at level k by using the power control mode of mode one, mode two or mode three, wherein k=1; or Nk attempts are made to send the preamble on the resource of the Physical Random Access Channel at level k, wherein the preamble is sent for Y1 times by using the power control mode of mode one and the preamble is sent for Y2 times by using the power control mode of mode two or mode three, wherein Y1≥0, Y2≥0 and k=1; or
the preamble is prohibited from being sent on the resource of the Physical Random Access Channel at level k, wherein k=2;
or, when the user equipment at level i satisfies at least one of a first type of condition, performing at least one of the following processing modes:
the preamble is sent on the resource of the Physical Random Access Channel at level k by using the power control mode of mode one, wherein k=0;
the preamble is sent on the resource of the Physical Random Access Channel at level k by using the power control mode of mode one, mode two or mode three, wherein k=1; or Nk attempts are made to send the preamble on the resource of the Physical Random Access Channel at level k, wherein the preamble is sent for Y1 times by using the power control mode of mode one and the preamble is sent for Y2 times by using the power control mode of mode two or mode three, wherein Y1≥0, Y2≥0 and k=1; or
the preamble is sent on the resource of the Physical Random Access Channel at level k by using the power control mode of mode one, mode two or mode three, wherein k=2; or Nk attempts are made to send the preamble on the resource of the Physical Random Access Channel at level k, wherein the preamble is sent for Y1 times by using the power control mode of mode one and the preamble is sent for Y2 times by using the power control mode of mode two or mode three, wherein Y1≥0, Y2≥0 and k=2; or Case 2: sending, by the user equipment at level i, the preamble on the resource of the Physical Random Access Channel at level k according to the determined power control mode comprises one of:

when the user equipment at level i satisfies a second type of condition, performing, by the user equipment at level i, at least one of the following processing modes:
  the preamble is sent on a resource of a Physical Random Access Channel at level i;
  a number of attempts made by the user equipment at level i to send the preamble on the resource of the Physical Random Access Channel at level i is reset to an initial value;
  the user equipment at level i reconfigures a power ramp step; or
  a counter for the number of attempts made by the user equipment at level i to send the preamble on the resource of the Physical Random Access Channel at level i is increased by one;
or, when the user equipment at level i satisfies the second type of condition, performing, by the user equipment at level i, at least one of the following processing modes:
  the preamble is sent on a resource of a Physical Random Access Channel at level i+1; or
  the user equipment at level i reconfigures the power ramp step; or Case 3: sending, by the user equipment at level i, the preamble on the resource of the Physical Random Access Channel at level k according to the determined power control mode comprises:
  when the user equipment at level i satisfies a third type of condition, performing, by the user equipment at level i, at least one of the following processing modes:
    the preamble is sent on a resource of a Physical Random Access Channel at level i;
    a number of attempts made by the user equipment at level i to send the preamble on the resource of the Physical Random Access Channel at level i continues being counted;
    the user equipment at level i reconfigures a power ramp step; or
    a counter for the number of attempts made by the user equipment at level i to send the preamble on the resource of the Physical Random Access Channel at level i is increased by one; or Case 4: sending, by the user equipment at level i, the preamble on the resource of the Physical Random Access Channel at level k according to the determined power control mode comprises one of:
  when the user equipment at level i satisfies a fourth type of condition, performing, by the user equipment at level i, at least one of the following processing modes:
    the preamble is sent on a resource of a Physical Random Access Channel at level i;
    a number of attempts made by the user equipment at level i to send the preamble on the resource of the Physical Random Access Channel at level i is reset to an initial value;
    the user equipment at level i reconfigures a power ramp step; or
    a counter for the number of attempts made by the user equipment at level i to send the preamble on the resource of the Physical Random Access Channel at level i is increased by one;
  or, when the user equipment at level i satisfies the fourth type of condition, performing, by the user equipment at level i, at least one of the following processing modes:
    the preamble is sent on a resource of a Physical Random Access Channel at level i+1; or
    the user equipment at level i reconfigures the power ramp step; or Case 5: sending, by the user equipment at level i, the preamble on the resource of the Physical Random Access Channel at level k according to the determined power control mode comprises:
  when the user equipment at level i satisfies at least one of a sixth type of condition, performing at least one of the following processing modes:
    the preamble is sent on the resource of the Physical Random Access Channel at level k by using the power control mode of mode one, wherein k=0;
    the preamble is sent on the resource of the Physical Random Access Channel at level k by using the power control mode of mode two, wherein k=1; or $N_k$ attempts are made to send the preamble on the resource of the Physical Random Access Channel at level k, wherein the preamble is sent for Y1 times by using the power control mode of mode one and the preamble is sent for Y2 times by using the power control mode of mode two or mode three, wherein Y1≥0, Y2≥0 and k=1; or
    the preamble is sent on the resource of the Physical Random Access Channel at level k by using the power control mode of mode three, wherein k=2; or $N_k$ attempts are made to send the preamble on the resource of the Physical Random Access Channel at level k, wherein the preamble is sent for Y1 times by using the power control mode of mode one and the preamble is sent for Y2 times by using the power control mode of mode two or mode three, wherein Y1≥0, Y2≥0 and k=2.

7. The method of claim 6, wherein in Case 1 and Case 5, the first type of condition and the sixth type of condition each comprises at least one of the following:
  a coupling loss (CL) satisfies CL≤MCL_0−Delta_0_CL;
  Reference Signal Received Power (RSRP) satisfies RSRP≥MRSRP_0+Delta_0_RSRP; or
  a path loss (PL) satisfies PL≤MPL_0−Delta_0_PL,
wherein MCL_0 denotes a threshold of the CL corresponding to level 0, MRSRP_0 denotes a threshold of the RSRP corresponding to level 0 and MPL_0 denotes a threshold of the PL corresponding to level 0; and Delta_0_CL, Delta_0_RSRP and Delta_0_PL are offsets,
wherein Delta_0_CL denotes a measurement error of the CL corresponding to level 0, Delta_0_RSRP denotes a measurement error of the RSRP corresponding to level 0 and Delta_0_PL denotes a measurement error of the PL corresponding to level 0.

8. The method of claim 6, wherein in each of Case 1 and Case 2, a value of level i of the user equipment at level i satisfies i=0.

9. The method of claim 6, wherein in Case 2,
the user equipment at level i reconfigures the power ramp step in the following manner: each user equipment configures the power ramp step separately,
wherein the second type of condition comprises at least one of the following:

after the number of attempts to send the preamble on the resource of the Physical Random Access Channel at level i reaches an upper limit $N_i$, a random access process fails;

after transmitted power used by the user equipment at level i to send the preamble on the resource of the Physical Random Access Channel at level i reaches the maximum transmitted power of the user equipment, the random access process fails; or after the transmitted power used by the user equipment at level i to send the preamble on the resource of the Physical Random Access Channel at level i reaches a maximum transmitted power of a user equipment corresponding to level i, the random access process fails, wherein when the counter for the number of attempts made by the user equipment at level i to send the preamble on the resource of the Physical Random Access Channel at level i reaches M and the user equipment at level i satisfies the second type of condition, the preamble is sent on the resource of the Physical Random Access Channel at level i+1, wherein M is greater than or equal to 1.

10. The method of claim 6, wherein in Case 3, the user equipment at level i reconfigures the power ramp step in the following manner: each user equipment configures the power ramp step separately, wherein the third type of condition comprises at least one of the following:

after the number of attempts to send the preamble on the resource of the Physical Random Access Channel at level i reaches an upper limit $N_i$, but transmitted power used by the user equipment at level i to send the preamble on the resource of the Physical Random Access Channel at level i does not reach the maximum transmitted power of the user equipment, a random access process fails; or after the number of attempts to send the preamble on the resource of the Physical Random Access Channel at level i reaches the upper limit $N_i$, but the transmitted power used by the user equipment at level i to send the preamble on the resource of the Physical Random Access Channel at level i does not reach a maximum transmitted power of a user equipment corresponding to level i, the random access process fails, wherein when the counter for the number of attempts made by the user equipment at level i to send the preamble on the resource of the Physical Random Access Channel at level i reaches M and the user equipment satisfies the third type of condition, the preamble is sent on a resource of a Physical Random Access Channel at level i+1, wherein M is greater than or equal to 1.

11. The method of claim 6, wherein in Case 3, the third type of condition comprises at least one of the following:

after the number of attempts to send the preamble on the resource of the Physical Random Access Channel at level i reaches an upper limit $N_i$, but transmitted power used by the user equipment at level i to send the preamble on the resource of the Physical Random Access Channel at level i does not reach the maximum transmitted power of the user equipment, a random access process fails; or after the number of attempts to send the preamble on the resource of the Physical Random Access Channel at level i reaches the upper limit $N_i$, but the transmitted power used by the user equipment at level i to send the preamble on the resource of the Physical Random Access Channel at level i does not reach a maximum transmitted power of a user equipment corresponding to level i, the random access process fails.

12. The method of claim 6, wherein in Case 4, the user equipment at level i reconfigures the power ramp step in the following manner: each user equipment configures the power ramp step separately, wherein the fourth type of condition comprises at least one of the following:

after transmitted power used by the user equipment at level i to send the preamble on the resource of the Physical Random Access Channel at level i reaches the maximum transmitted power of the user equipment, a random access process fails; or after the transmitted power used by the user equipment at level i to send the preamble on the resource of the Physical Random Access Channel at level i reaches a maximum transmitted power of a user equipment corresponding to level i, the random access process fails, wherein when the counter for the number of attempts made by the user equipment at level i to send the preamble on the resource of the Physical Random Access Channel at level i reaches M and the user equipment satisfies the fourth type of condition, the preamble is sent on the resource of the Physical Random Access Channel at level i+1, wherein M is greater than or equal to 1.

13. The method of claim 6, wherein in each of Case 2, Case 3 and Case 4, the user equipment further satisfies a fifth type of condition, wherein the fifth type of condition comprises at least one of the following:

a coupling loss (CL) satisfies $CL \leq MCL\_0 - Delta\_0\_CL$;

Reference Signal Received Power (RSRP) satisfies $RSRP \geq MRSRP\_0 + Delta\_0\_RSRP$; or a path loss (PL) satisfies $PL \leq MPL\_0 - Delta\_0\_PL$, wherein MCL_0 denotes a threshold of the CL corresponding to level 0, MRSRP_0 denotes a threshold of the RSRP corresponding to level 0 and MPL_0 denotes a threshold of the PL corresponding to level 0; and Delta_0_CL, Delta_0_RSRP and Delta_0_PL are offsets, wherein Delta_0_CL denotes a measurement error of the CL corresponding to level 0, Delta_0_RSRP denotes a measurement error of the RSRP corresponding to level 0 and Delta_0_PL denotes a measurement error of the PL corresponding to level 0.

14. A user equipment, comprising:

a memory, a processor, and a power control program stored in the memory and executable on the processor, wherein the power control program, when executed by the processor, implements the power control method of claim 1.

15. A non-transitory computer-readable storage medium, wherein a power control program is stored in the non-transitory computer-readable storage medium, and the power control program, when executed by a processor, implements the power control method of claim 1.

16. A power control method, comprising:

configuring at least two maximum transmitted power values; and when a preset condition is satisfied, sending, by a user equipment, an uplink channel by using one of the at least two maximum transmitted power values,
wherein the preset condition comprises at least one of the following:
a number N of repeated transmissions of the uplink channel is greater than or equal to a threshold Nth;
a level index i of the user equipment is greater than or equal to an index threshold A; or
a sending repetition level j of the uplink channel is greater than or equal to a repetition level threshold B.

17. The method of claim 16, wherein
configuring the at least two maximum transmitted power values comprises configuring a first maximum transmitted power value and a second maximum transmitted power value; and
    when the preset condition is satisfied, sending, by the user equipment, the uplink channel by using the one of the at least two maximum transmitted power values comprises:
        when the preset condition is satisfied, sending, by the user equipment, the uplink channel by using the second maximum transmitted power value,
wherein the first maximum transmitted power value is configured uniformly; and
the second maximum transmitted power value satisfies at least one of the following: configuration is performed for the user equipment at each level separately or configuration is performed for each user equipment separately,
wherein the second maximum transmitted power value is greater than or equal to the first maximum transmitted power value,
wherein the uplink channel comprises at least one of the following channels: an uplink data channel, a random access channel or a scheduling request channel.

18. A user equipment, comprising:
a memory, a processor, and a power control program stored in the memory and executable on the processor, wherein when the power control program is executed by the processor, the power control method of claim 16 is performed.

19. A non-transitory computer-readable storage medium, wherein a power control program is stored in the non-transitory computer-readable storage medium, and the power control program, when executed by a processor, implements the power control method of claim 16.

* * * * *